United States Patent
Morinaga

(10) Patent No.: US 8,371,159 B2
(45) Date of Patent: Feb. 12, 2013

(54) METHOD FOR ESTIMATING THE WEAR OF A TIRE

(75) Inventor: Hiroshi Morinaga, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 504 days.

(21) Appl. No.: 12/668,465

(22) PCT Filed: Jul. 11, 2008

(86) PCT No.: PCT/JP2008/062576
§ 371 (c)(1),
(2), (4) Date: Jan. 11, 2010

(87) PCT Pub. No.: WO2009/008502
PCT Pub. Date: Jan. 15, 2009

(65) Prior Publication Data
US 2010/0186492 A1    Jul. 29, 2010

(30) Foreign Application Priority Data

Jul. 11, 2007 (JP) ................................. 2007-182254
Jun. 6, 2008 (JP) ................................. 2008-149199

(51) Int. Cl.
*G01M 17/02* (2006.01)
(52) U.S. Cl. ........................................................ 73/146
(58) Field of Classification Search ........................ None
See application file for complete search history.

(56) References Cited

U.S. PATENT DOCUMENTS

| 6,561,018 | B2 * | 5/2003 | Mancosu et al. ................ 73/146 |
| 6,609,417 | B1 * | 8/2003 | Cantu et al. ..................... 73/146 |
| 6,763,288 | B2 * | 7/2004 | Caretta et al. ..................... 701/1 |
| 7,000,462 | B2 * | 2/2006 | Hillenmayer et al. ........ 73/146.5 |
| 7,204,135 | B2 * | 4/2007 | Robert ............................. 73/146 |
| 7,213,451 | B2 * | 5/2007 | Zhu et al. ......................... 73/146 |
| 7,243,533 | B2 * | 7/2007 | Mancosu et al. ................ 73/146 |
| 7,260,984 | B2 * | 8/2007 | Roundy et al. ............... 73/146.5 |
| 7,370,523 | B2 * | 5/2008 | Kitazaki et al. ................. 73/146 |
| 7,469,578 | B2 * | 12/2008 | Matsuda et al. ................ 73/146 |

(Continued)

FOREIGN PATENT DOCUMENTS

| EP | 1219515 A1 | 7/2002 |
| EP | 1759891 A1 | 3/2007 |

(Continued)

OTHER PUBLICATIONS

International Search Report dated Sep. 22, 2008 (4 pages).

(Continued)

*Primary Examiner* — Lisa Caputo
*Assistant Examiner* — Jermaine Jenkins
(74) *Attorney, Agent, or Firm* — Sughrue Mion, PLLC

(57) ABSTRACT

The degree of wear of a tire is estimated with constant accuracy. An acceleration sensor (11) is installed on the inner surface in the inner liner region of a tire to detect the acceleration of the tread in the radial direction of the tire. The peak level on the leading edge side or the trailing edge side of the tread appearing in the differentiated waveform of the detected acceleration is calculated and used as an index V of deformation speed of the tread. The degree of wear of the tire is estimated on the basis of the calculated index V of deformation speed and an M-V map (16B) showing a predetermined relationship between the degree M of tire wear and the index V of deformation speed.

20 Claims, 18 Drawing Sheets

U.S. PATENT DOCUMENTS

| | | | |
|---|---|---|---|
| 7,546,764 B2 * | 6/2009 | Morinaga et al. | 73/146 |
| 7,782,183 B2 * | 8/2010 | Wieser | 340/447 |
| 7,856,871 B2 * | 12/2010 | Mancosu et al. | 73/146.5 |
| 7,918,131 B2 * | 4/2011 | Matsuda et al. | 73/146.5 |
| 7,945,361 B2 * | 5/2011 | Brusarosco et al. | 701/36 |
| 2002/0116992 A1 | 8/2002 | Rickel | |
| 2007/0213953 A1 | 9/2007 | Kitazaki et al. | |
| 2007/0240502 A1 | 10/2007 | Morinaga et al. | |

FOREIGN PATENT DOCUMENTS

| | | |
|---|---|---|
| EP | 1897706 A1 | 3/2008 |
| JP | 6-278419 A | 10/1994 |
| JP | 7-164830 A | 6/1995 |
| JP | 10-307981 A | 11/1998 |
| JP | 2003-214808 A | 7/2003 |
| JP | 2004-205437 A | 7/2004 |
| JP | 2005-28950 A | 2/2005 |
| JP | 2006-145366 A | 6/2006 |
| JP | 2006-290228 A | 10/2006 |
| JP | 2007-153034 A | 6/2007 |
| JP | 2007-168671 A | 7/2007 |
| WO | 2006/001255 A1 | 1/2006 |

OTHER PUBLICATIONS

European Search Report issued Jul. 30, 2012 for counterpart European Application No. 08778091.

* cited by examiner

METHOD FOR ESTIMATING THE WEAR OF A TIRE

TECHNICAL FIELD

The present invention relates to a method for estimating the degree of wear of a tire.

BACKGROUND ART

Generally tire wear leads to lowered draining performance and longer braking distance on wet road surfaces. Also, in the case of winter tires, wear can bring about a marked drop in grip performance on an icy or snow-covered road. Furthermore, excessive wear can be very dangerous by allowing water to seep into the tread belts, which can eventually cause a rupture of the tire. Small vehicles are so arranged that when the remaining groove depth of a tire is reduced to 1.6 mm, a rubber projection called a "slip sign" makes its appearance in the tire groove. To ensure running safety of a vehicle, tires should be replaced before the appearance of the slip sign, but there are, in fact, many drivers who are least interested in such maintenance practice.

Thus, there is demand for technologies for automatically detecting wear of tires to give a warning to the driver. Also, from the viewpoint of vehicular control, it is desired that control for greater safety be realized through the grasp of changes in tire characteristics resulting from wear.

A known method for estimating wear of a tire is such that the absolute speed of a vehicle is calculated using GPS, an optical sensor or the like, then the dynamic radius of the tire is calculated by comparing it with the rotational speed of the wheel, and the amount of tire wear is derived from the difference between the dynamic radius of the tire and the radius of the tire when it is new (refer to Patent Documents 1 and 2, for example).

However, even for a completely worn tire, the difference in rotational speed between the worn tire and the new tire is about 1% at most. It has therefore been difficult to realize a constantly accurate estimation of tire wear from the difference in tire radius because of the necessity not only to measure with great accuracy but also to take into consideration various error factors in vehicular running such as the inner-outer wheel errors in cornering, errors due to acceleration slips at braking or drive, and errors due to inclinations of the road surface.

Also, other methods proposed for estimating tire wear may be such that a transponder or an IC tag is embedded in the tire tread together with a receiver installed on the vehicle body and tire wear is estimated using the loss of response as the transponder or the IC tag is broken or falls off when the tire is worn (refer to Patent Documents 3 to 5, for example) or that a detector consisting of a magnetic material or a conductive rubber is embedded in the tire tread together with a sensor installed on the vehicle body and tire wear is estimated by detecting the change in the signals detected by the sensor as the detector wears off as a result of tire wear (refer to Patent Documents 6 and 7, for example).

Patent Document 1: Japanese Unexamined Patent Application Publication No. 6-278419
Patent Document 2: Japanese Unexamined Patent Application Publication No. 7-164830
Patent Document 3: Japanese Unexamined Patent Application Publication No. 10-307981
Patent Document 4: Japanese Unexamined Patent Application Publication No. 2004-205437
Patent Document 5: US2002/0116992A1
Patent Document 6: Japanese Unexamined Patent Application Publication No. 2003-214808
Patent Document 7: Japanese Unexamined Patent Application Publication No. 2005-28950

DISCLOSURE OF THE INVENTION

Problems to be Solved by the Invention

However, the methods using a transponder or IC tag or a magnetic material or conductive rubber embedded in the tire tread have not only the problem of adverse effects on the durability of the tire when the detector or sensor is exposed in the contact patch with the progress of wear but also the problem of lowered grip force of the tire when the rubber whose physical properties are different from those of the tread rubber is exposed on the surface of the tire tread.

The present invention has been made in view of these conventional problems, and an object thereof is to provide a method for estimating the degree of wear of a tire with constant accuracy while ensuring an excellent durability of the sensor and the tire.

Means for Solving the Problems

FIG. 18 is a schematic illustration showing a profile of a tire distorted by the application of a load thereon. As a load is applied to the tire, the part of tire in contact with the road surface (contact patch or footprint) is pushed in toward the tire center, and the regions of the tire near it are so deformed as to bulge out from the initial profile shown by a dashed-dotted line in the figure. Here the point outside the contact patch where the tire 1 bulges outmost is defined by the term "bulge point(s)" and the edge(s) of the contact patch of the tire 1 by the term "contact edge(s)". Also, the term "contact edge portion" refers to the contact edge and its vicinity (portions in front and back of the contact edge).

Through investigation into the differences in deformation between a new tire and worn tires, the inventors have come to realize that for the same amount of distortion given, worn tires show greater deformation speed at the contact edge portion, such as the leading edge or the trailing edge of contact patch, and a greater amount of deformation at the bulge points than new tires. The reason is presumably that the rigidity against out of plane bending deformation of the tread face is lowered due to the reduced tread rubber of worn tires. Thus, the inventors have worked on various analysis methods using information on deformation speed or amount of deformation at the contact edge portions and eventually made the present invention which realizes the estimation of tire wear with excellent accuracy regardless of the differences in use conditions of the tire or in the wear mode.

Thus, according to a first aspect of the present invention, there is provided a method for estimating the wear of a tire comprising: estimating the degree of wear of a tire using information on the deformation speed in the radial direction at a contact edge portion of the tire tread or information on the amount of deformation in the radial direction at a bulge point of the tire. As a result, tire wear can be estimated with excellent accuracy even in the cases where there are differences in the wear mode, such as more wear in the shoulder region than in the tread center region, or where there is variation in the use conditions such as load on the tire.

According to a second aspect of the present invention, there is provided a method for estimating the wear of a tire, wherein the index of deformation speed in the radial direction at a contact edge portion of the tire tread is calculated based on input information from a sensor disposed in the inner liner region of the tire and the magnitude of the calculated index is used as information on the deformation speed at the contact edge portion of the tire. While the tread, side, and wheel regions may be conceivable as positions where the sensor can be installed to obtain information on the deformation speed at a contact edge portion of the tire, the position where information on the deformation speed can be detected with constancy under varied conditions is limited to the tread region. That is, the degree of tire wear can be estimated with better accuracy by measuring the deformation of the tread directly and calculating the index of radial deformation speed from the signals. It is to be noted that the index of deformation speed means the deformation speed itself or any quantity that can substitute for the deformation speed. As for the position for installing the sensor, the inner liner region of the tire is preferable from the viewpoint of durability, and the axial center of tire cross section is preferable from the viewpoint of data stability. Placing the sensor in the inner liner region can improve the durability of the sensor and the tire markedly compared with the conventional arrangement in which a transponder or an IC tag is embedded in the tire tread. The term "inner liner region" as used herein means the surface (inner surface of the tire) of the inner liner, the inside of the inner liner rubber, or the boundary surface of the inner liner facing a rubber covering the ply.

According to a third aspect of the present invention, there is provided a method for estimating the wear of a tire, wherein the sensor is an acceleration sensor and the index of deformation speed is calculated using a time-series waveform of the radial acceleration of the tire tread detected by the acceleration sensor. The acceleration sensor is a highly responsive sensor. With this sensor placed to detect the radial acceleration of the tire tread, it is possible to detect the deformation speed of the tread accurately without time lag, and this contributes to accurate estimation of the degree of tire wear.

According to a fourth aspect of the present invention, there is provided a method for estimating the wear of a tire, wherein the differential peak value, which is the magnitude of the peak of a temporally-differentiated waveform obtained by temporally differentiating the time-series waveform of radial acceleration of the tire, the average value of the differential values around the peak, or the slope at or near the contact edge of the time-series waveform of radial acceleration when the peak position is assumed to be at the contact edge of the tire tread is calculated, and one of these values is used as the index of deformation speed. That is, the time-series waveform of radial acceleration of the tire occurs in response to the forces the tire tread receives in the radial direction, as is evidenced by comparison with the strain waveform and FEM calculation results. It provides values substituting for the amount of radial deformation although there is some phase difference. Hence, the differential values of the above time-series waveform represent the index of deformation speed, and the peak position corresponds to the contact edge. Therefore, if the differential peak value, which is the magnitude of the peak of the temporally-differentiated waveform, the average value of the differential values near the peak, or the slope at or near the contact edge of the radial acceleration waveform when the peak position is assumed to be at a contact edge of the tire is used as the index of deformation speed, it is possible to enhance the accuracy of measurement of the index of deformation speed.

According to a fifth aspect of the present invention, there is provided a method for estimating the wear of a tire, wherein the index of deformation speed by which to estimate the degree of tire wear is an average value of the index of deformation speed at or near the leading edge of the contact patch and the index of deformation speed at or near the trailing edge thereof. This allows the estimation of the degree of tire wear with greater constancy because it is less susceptible to the effects of the fore-aft forces working on the tire or the attitude angle of the tire. It should be noted that there is a positive-negative inversion in the sign of the deformation speed between the leading edge side and the trailing edge side, and therefore when a simple mean value is to be used for the average value, it is necessary to average the absolute values. Note also that the method for calculating the average value is not limited to the simple averaging; other methods such as using the root mean square may be used also.

According to a sixth aspect of the present invention, there is provided a method for estimating the wear of a tire, wherein the index of deformation speed in the radial direction at or near the contact edge of the tire tread is measured using the time-series waveform of radial acceleration of the tire tread detected by the acceleration sensor, the measured index of deformation speed is standardized based on information on the rotation time of the tire or information on the rotational speed of the tire, and the degree of tire wear is estimated from the magnitude of the standardized index of deformation speed. The index of deformation speed measured by the acceleration sensor changes with the rotational speed of the tire. Therefore, if the effects of the rotational speed of the tire is eliminated by using the index of tread deformation speed measured by the acceleration sensor as the measure for estimating the wear condition of the tire and at the same time standardizing the index of deformation speed based on information on the rotation time of the tire or information on the rotational speed of the tire, then the wear condition of the tire can be estimated with excellent constancy.

According to a seventh aspect of the present invention, there is provided a method for estimating the wear of a tire, wherein the index of deformation speed is standardized by multiplying the measured index of deformation speed by a cube of the rotation time of the tire.

Also, according to an eighth aspect of the present invention, there is provided a method for estimating the wear of a tire, wherein the index of deformation speed is standardized by dividing the measured index of deformation speed by a cube of rotational speed of the tire.

The acceleration inputted to the acceleration sensor is proportional to the centrifugal force, or the square of the rotational speed. Also, as is described in the explanation of the fourth aspect of the invention, the deformation speed in the radial direction of the tread is a value obtained by dividing the acceleration by the time. And since the time required for the deformation at the contact edge is inversely proportional to the rotational speed, the deformation speed is proportional to the cube of the rotational speed. Accordingly, the index of deformation speed should be standardized either by multiplying the deformation speed by the cube of the rotation time as in the case of the seventh aspect of the invention or by dividing the deformation speed by the cube of the rotational speed as in the case of the eighth aspect of the invention. Then the standardized deformation speed remains constant even when the speed changes, so that the accuracy of estimation of the wear condition of the tire can be further enhanced.

Also, according to a ninth aspect of the present invention, there is provided a method for estimating the wear of a tire, wherein the rotation time or rotational speed of the tire is calculated using the signals outputted from the acceleration sensor.

According to a tenth aspect of the present invention, there is provided a method for estimating the wear of a tire, wherein the time from the point at which a peak appears in the time-series waveform of acceleration outputted from the acceleration sensor or in the temporally-differentiated waveform or temporally-integrated waveform of the time-series waveform of acceleration to the point at which a peak appears in the same position after one revolution of the tire is measured and the measured time is used as the rotation time of the tire.

According to an eleventh aspect of the present invention, there is provided a method for estimating the wear of a tire, wherein the value of a rotation length coefficient divided by the rotation time is used as the rotational speed of the tire.

In this way, if the rotation time or the rotational speed of the tire is calculated using the signals outputted from the acceleration sensor, the apparatus can be made smaller because there will be no need to use a rotation sensor such as a wheel speed sensor. Moreover, the signal processing circuit can be made simpler because signal processing such as synchronizing the outputs of two sensors will no longer be necessary.

According to a twelfth aspect of the present invention, there is provided a method for estimating the wear of a tire, wherein the relationship between the index of deformation speed and the degree of tire wear is determined beforehand and the degree of tire wear is estimated by comparing this predetermined relationship between the index of deformation speed and the degree of tire wear with the calculated index of deformation speed. This arrangement allows estimation of the degree of tire wear with even better accuracy. Note here that the index of deformation speed used in the relationship between the index of deformation speed and the degree of tire wear may be either the magnitude of the index or the amount of change in the magnitude from the start of use of the index. The magnitude of the index can change from that of a new tire, depending on factors in the fabrication of the tire and those in the installation of the sensor. In such a case, the constancy of estimation can be improved by measuring the value of the index at the start of use, calculating the amount of change from the initial value, and comparing them with the predetermined relationship.

According to a thirteenth aspect of the present invention, there is provided a method for estimating the wear of a tire designed to reduce the effects of the load or the wear mode on the accuracy of estimating the degree of tire wear. In this method, the index of contact length of the tire, which is highly correlated with the load and also closely related to the wear mode, is measured and the degree of tire wear is estimated based on the measured index of contact length and the standardized index of deformation speed. Thus, the degree of tire wear can be estimated with excellent accuracy even when there is a change in the load applied on the tire or when the wear mode is different as in "shoulder wear" or "center wear".

According to a fourteenth aspect of the present invention, there is provided a method for estimating the wear of a tire, wherein the relationship between the standardized index of deformation speed and the index of contact length, relative to the degree of tire wear, is determined beforehand and the degree of tire wear is estimated by comparing the standardized index of deformation speed and the measured index of contact length with the predetermined relationship between the standardized index of deformation speed and the index of contact length. That is, a relationship between the standardized index of deformation speed and the index of contact length is determined beforehand in the form of a graph or the like in relation to the different degrees of tire wear. Then the standardized index of deformation speed and the measured index of contact length are compared with the predetermined relationship between the standardized index of deformation speed and the index of contact length by checking to see which line of the degree of wear in the graph the standardized index of deformation speed and the measured index of contact length correspond to, for instance. In this way, the degree of wear of a tire can be estimated with even better accuracy. Also, as is described in the explanation of the twelfth aspect of the invention, the index of deformation speed indicates the magnitude thereof or the amount of change thereof from the start of use.

According to a fifteenth aspect of the present invention, there is provided a method for estimating the wear of a tire, wherein a correlation equation of the measured index of contact length and the standardized index of deformation speed is determined and the degree of tire wear is estimated based on the magnitude of the coefficient of this correlation equation. The correlation equation in a linear approximation, for example, may be expressed as $Y=aX+b$ (X: index of contact length, Y: standardized index of deformation speed, a, b: constants), and by fixing the value of a, the degree of wear may be estimated from the value of b. Or the degree of wear may also be estimated based on the amount of change of the magnitude of a coefficient, such as the value of b, from the start of use. It should be appreciated that the correlation equation does not need to be a linear approximation as above, and therefore it is only necessary to determine a relationship between the standardized deformation speed and the index of contact length in advance and select an approximate expression that best represents the relationship.

According to a sixteenth aspect of the present invention, there is provided a method for estimating the wear of a tire, wherein the index of contact length is the contact time, which is an interval of time during which a certain part of the tread is in contact with the road surface.

According to a seventeenth aspect of the present invention, there is provided a method for estimating the wear of a tire, wherein the index of contact length is the contact time ratio which is obtained by dividing the contact time, which is an interval of time during which a certain part of the tread is in contact with the road surface, by the rotation time. This value is nearly equal to the value of ratio obtained by dividing the contact length by the length of one revolution of the tire.

According to a eighteenth aspect of the present invention, there is provided a method for estimating the wear of a tire, wherein the index of contact length is the circumferential length of the contact patch of the tire.

According to a nineteenth aspect of the present invention, there is provided a method for estimating the wear of a tire, wherein the value obtained by multiplying the contact time, which is an interval of time during which a certain part of the tread is in contact with the road surface, by the rotational speed of the tire is a circumferential length of the contact patch.

As described above, if the contact time, which is an interval of time during which a certain part of the tread is in contact with the road surface, the contact time ratio obtained by dividing the contact time by the rotation time, or the circumferential length of the contact patch is used as the index of contact length, then the effects of the load and the form of tire wear on the estimation can be reduced and thus the degree of tire wear can be estimated with high reliability. Also, if the value for the circumferential length of the contact patch is one obtained by multiplying the contact time, which is an interval of time during which a certain part of the tread is in contact with the road surface, by the rotational speed, then it is possible to derive the circumferential length of the contact patch with excellent accuracy.

According to a twentieth aspect of the present invention, there is provided a method for estimating the wear of a tire, wherein the index of contact length is calculated using the signals outputted from the acceleration sensor. This arrangement can make the apparatus simpler.

According to a twenty-first aspect of the present invention, there is provided a method for estimating the wear of a tire, wherein the radial acceleration of the tire is detected by the acceleration sensor, at the same time the time between the two peaks of the temporally-differentiated waveform obtained by temporally differentiating the time-series waveform of the detected radial acceleration of the tire is measured as a contact time, and the index of contact length is calculated using the measured contact time. This further enhances the accuracy of the index of contact length to be calculated using the contact time.

According to a twenty-second aspect of the present invention, there is provided a method for estimating the wear of a tire, wherein the index of the amount of radial deformation of the tread at the bulge point is calculated based on input information from the sensor disposed in the tire tread region and the magnitude of the calculated index is used as information on the amount of deformation at the bulge point of the tire. For example, the index of the amount of deformation, such as the magnitude of the peak level of radial acceleration of the tire tread to be discussed later, is calculated, and the degree of tire wear is estimated using this calculated index of the amount of deformation as information on the amount of deformation at the edge of the contact patch. Then the degree of tire wear can be estimated with excellent accuracy because the deformation of the tread is measured directly.

According to a twenty-third aspect of the present invention, there is provided a method for estimating the wear of a tire, wherein the sensor is an acceleration sensor and the index of the amount of deformation is calculated using a time-series waveform of the radial acceleration of the tire tread detected by the acceleration sensor. The acceleration sensor is a highly responsive sensor as described earlier. Therefore, placing the sensor in position to detect the radial acceleration of the tire tread will allow an accurate detection of the amount of deformation of the tread and in consequence a highly accurate estimation of the degree of tire wear.

According to a twenty-fourth aspect of the present invention, there is provided a method for estimating the wear of a tire, wherein the peak level of the time-series waveform of radial acceleration is calculated and the calculated peak level is used as the index of the amount of deformation. When the acceleration waveform represents the radial acceleration of the tire, the time-series waveform of the acceleration itself corresponds to the amount of deformation, so that the index of the amount of deformation can be calculated with excellent accuracy.

According to a twenty-fifth aspect of the present invention, there is provided a method for estimating the wear of a tire, wherein the relationship between the index of the amount of deformation and the degree of tire wear is determined beforehand and the degree of tire wear is estimated by comparing this predetermined relationship between the index of the amount of deformation and the degree of tire wear with the calculated index of the amount of deformation. As a result, the degree of tire wear can be estimated with even better accuracy. Note here that the index of the amount of deformation used in the relationship between the index of deformation amount and the degree of tire wear may be either the magnitude of the index or the amount of change in the magnitude from the start of use of the index. The magnitude of the index can change from that of a new tire, depending on factors in the fabrication of the tire and those in the installation of the sensor. In such a case, the constancy of estimation can be improved by measuring the value of the index at the start of use, calculating the amount of change from the initial value, and comparing them with the predetermined relationship.

According to a twenty-sixth aspect of the present invention, there is provided a method for estimating the wear of a tire, wherein the upper limit of tire speed in estimating the degree of tire wear is 100 km/h. This allows the tire wear to be estimated with excellent constancy. That is, in the present method, tire wear is estimated by obtaining information on the deformation of the tread, but above the tire speed of 100 km/h, the method will need a significant correction because at those speeds it is subject to an extremely large influence of centrifugal force. However, since tire wear is a very slow change over time, there is no problem with interruptions of estimation during high-speed running of the vehicle. Therefore, as described above, setting an upper limit of tire speed in estimating the degree of tire wear will enhance the constancy of estimation.

Figure 1:
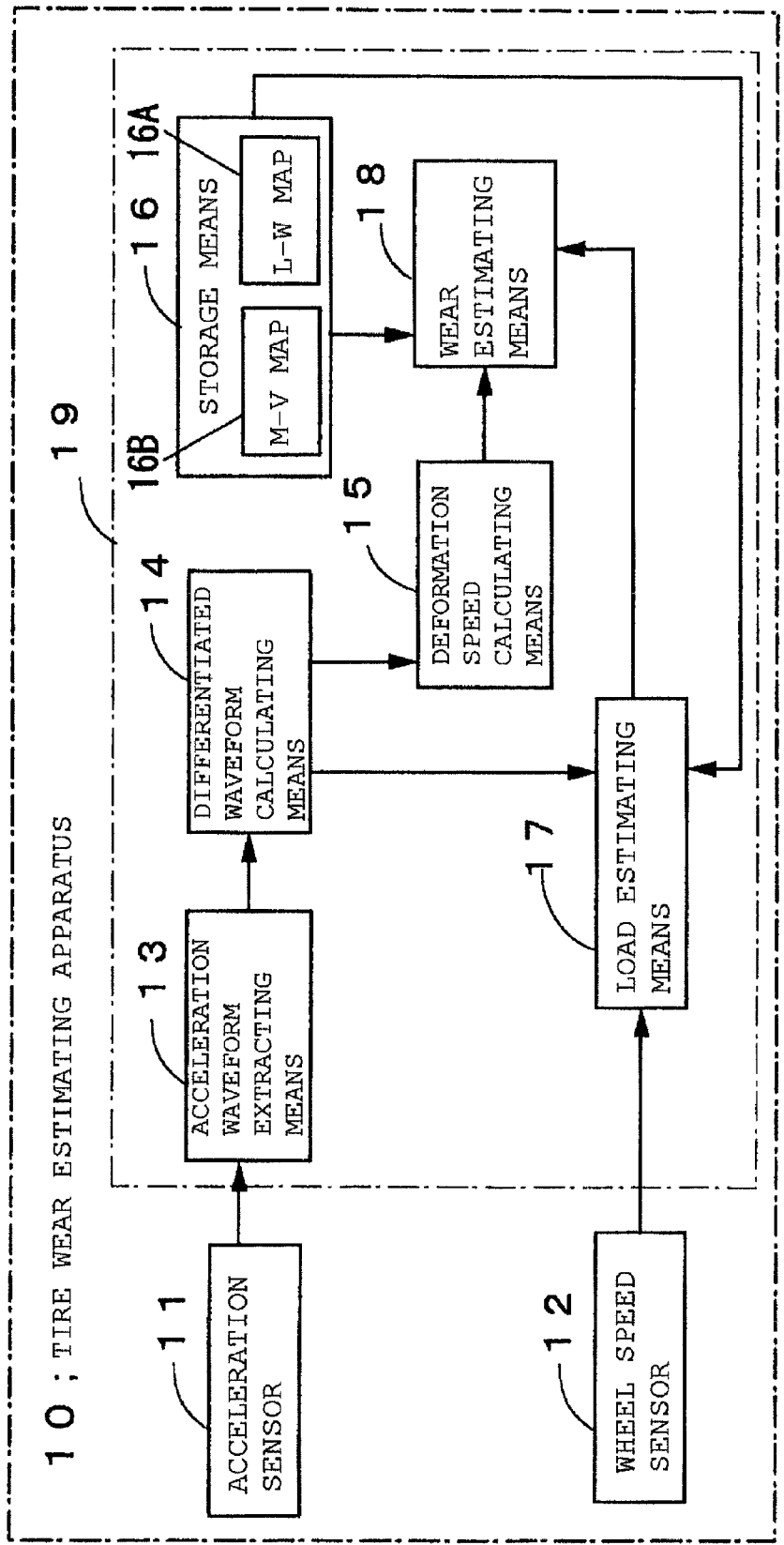
FIG. 1 is a functional block diagram showing a structure of a tire wear estimating apparatus according to Embodiment 1 of the present invention.

EXPLANATION FOR SYMBOLS 1 tire
2 inner liner region
3 tire tread
4 wheel
5 circumferential groove
6 shoulder region
7 center region
10, 20, 30 tire wear estimating apparatus
11 acceleration sensor
11F transmitter
12 wheel speed sensor
13 acceleration waveform extracting means
14 differentiated waveform calculating means
15 deformation speed calculating means
16 storage means
16A L-W map
16B M-V map
17 load estimating means
18 wear estimating means
19 calculating section
25 deformation amount calculating means
26 storage means
26B M-Y map
28 wear estimating means
30A sensor section
30B calculating section
32 acceleration differentiated waveform calculating means
33 deformation speed calculating means
34 rotation time calculating means
35 contact time calculating means
36 contact time ratio calculating means
37 standardized deformation speed index calculating means
38 storage means
38M V(M)-L map
39 tire wear estimating means

BEST MODE FOR CARRYING OUT THE INVENTION

Preferred embodiments of the present invention will be described hereinbelow with reference to the accompanying drawings.

Embodiment 1

FIG. 1 is a functional block diagram showing a structure of a tire wear estimating apparatus 10 according to Embodiment 1 of the present invention. In the figure, reference numeral 11 denotes an acceleration sensor for detecting the acceleration of the tire tread, 12 a wheel speed sensor for detecting the rotational speed of a wheel, 13 an acceleration waveform extracting means for extracting a time-series waveform of the acceleration of the tire tread from the output of the acceleration sensor, 14 a differentiated waveform calculating means for calculating a differentiated waveform of acceleration which is a time-series waveform of values of differentiated acceleration, 15 a deformation speed calculating means for calculating the level of a leading edge side peak, which is the former of the two peaks appearing in the differentiated waveform of acceleration, and outputting the calculated level of the leading edge peak, 16 a storage means 16 for storing a predetermined L-W map 16A showing a relationship between contact length L and load W and a predetermined M-V map 16B showing a relationship between degree M of tire wear and index V of deformation speed, 17 a load estimating means for calculating a contact time between two peaks, which correspond to deformation at contact edges of the tread, appearing in the differentiated waveform of acceleration, calculating the contact length L of the tire by multiplying the calculated contact time by the tire speed, and outputting the load W of the tire by estimating it from the calculated contact length L using the L-W map 16A stored in the storage means 16, and 18 a wear estimating means 18 for estimating the degree of wear of the tire from the index V of deformation speed calculated by the deformation speed calculating means 15, the M-V map 16B, and the load W estimated by the load estimating means 17. It is to be noted that in the present embodiment, the rotational speed of the tire is calculated using the rotation time of the wheel detected by the wheel speed sensor 12 and the coefficient of rotation length of the tire.

Figure 2:
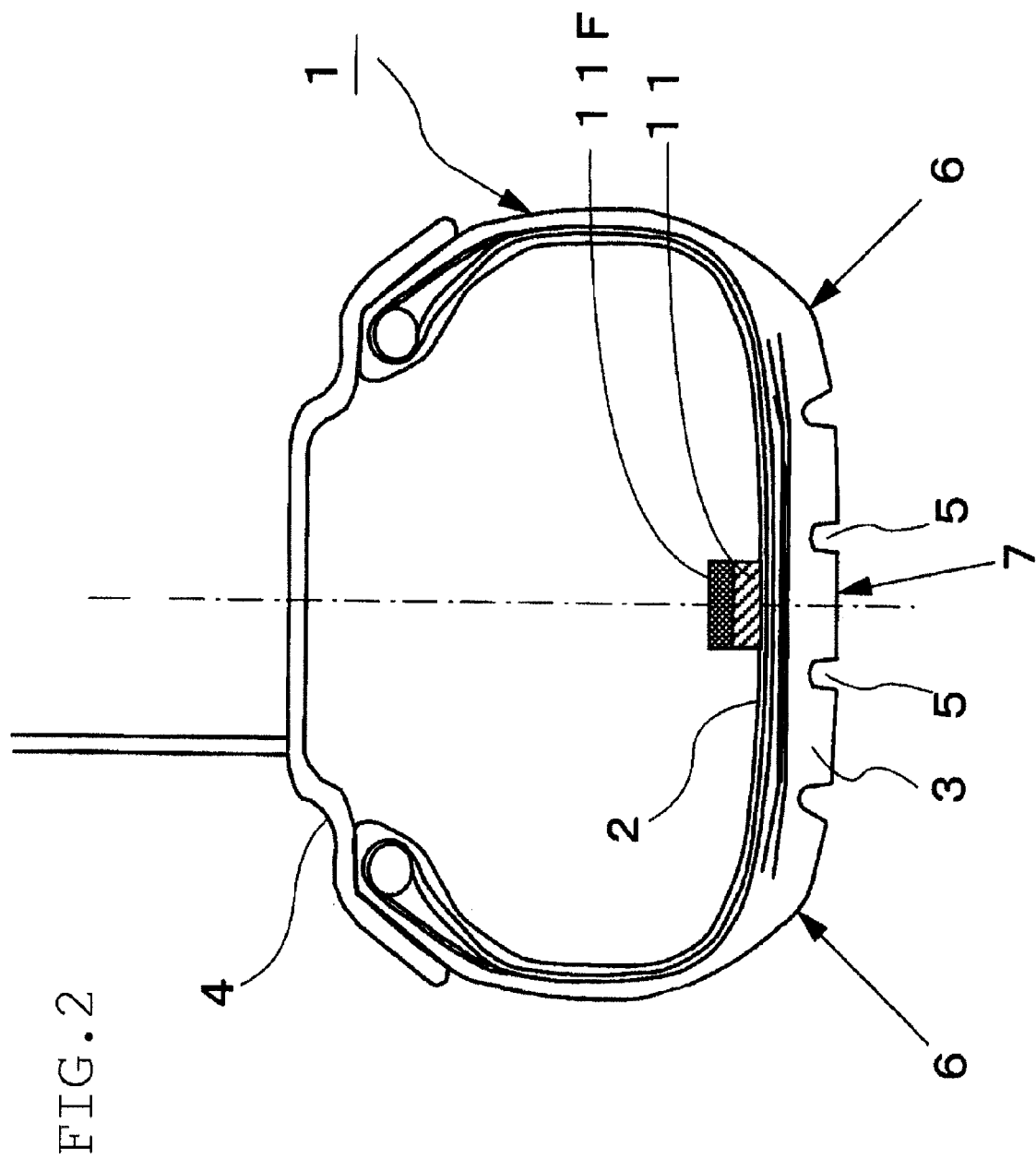
FIG. 2 is an illustration showing an example of installation of an acceleration sensor.

Also, in the present embodiment, as shown in FIG. 2, an acceleration sensor 11 is placed at the axial (tire width) center in the inner liner region 2 of a tire 1 such that the detection can be made in the radial direction of the tire, and the radial acceleration working from the road surface on the inner surface of the tire tread 3 is detected.

The wheel speed sensor 12 used is a wheel speed sensor of a well-known electromagnetic induction type, which has a sensor section, consisting of a yoke and a coil, mounted on a not-shown knuckle to detect the rotation of the wheel axle.

Also, the component means from the acceleration waveform extracting means 13 to the wear estimating means 18 constitute a calculating section 19 which is installed on the vehicle body.

As an arrangement for sending output signals of the acceleration sensor 11 to the calculating section 19, it is preferable that a transmitter 11F is installed in the inner liner region 2 or on a wheel 4 as shown in FIG. 2, for instance, and the output signals, after they are amplified by a not-shown amplifier, are transmitted to the calculating section 19 wirelessly. The arrangement may also be such that the calculating section 19 is installed on the tire and the results of estimation by the wear estimating means 18 are transmitted to a not-shown vehicle control unit on the vehicle body.

Now a tire wear estimating method according to Embodiment 1 will be explained.

Figure 3:
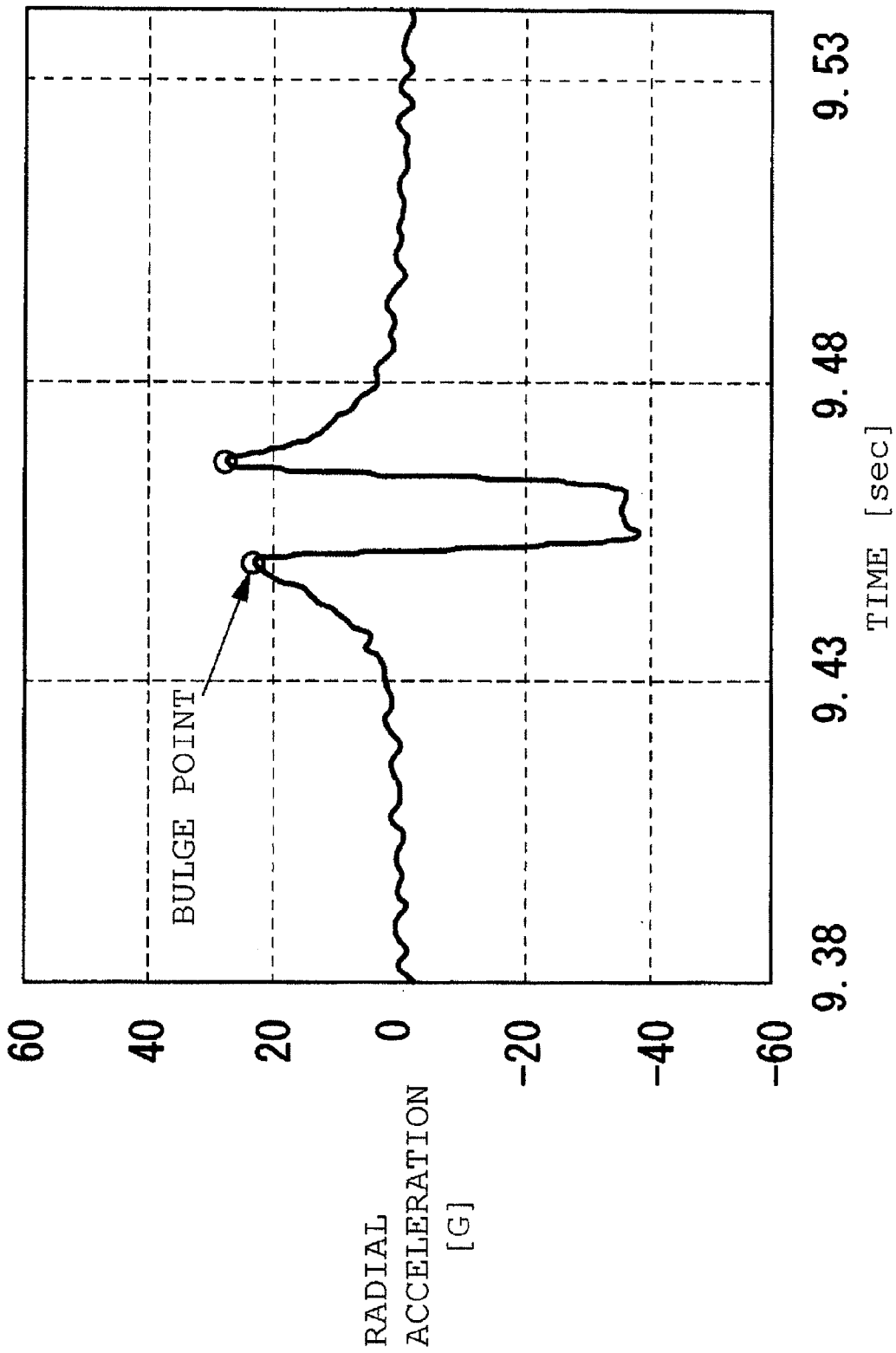
FIG. 3 is a diagram showing a waveform of radial acceleration of a tire.

First the acceleration in the radial direction of the inner surface of the inner liner region 2 which deforms along with the deformation of the tire tread 3 is detected by the acceleration sensor 11. The acceleration waveform extracting means 13 extracts a time-series waveform of the radial acceleration (hereinafter referred to as acceleration waveform) from the output signals of the acceleration sensor. FIG. 3 is a diagram showing an example of an acceleration waveform, the horizontal axis representing time (sec) and the vertical axis the magnitude (G) of acceleration in the radial direction. When the acceleration is of a positive value, the acceleration is occurring in the direction of the outside of the tire, and when it is of a negative value, it is occurring in the direction of the tire center. The acceleration, which occurs in response to the forces the tire tread receives in the radial direction, is a value substituting for the amount of radial deformation although there is some phase difference. The vicinities of the two peaks on the positive side are outside the contact patch and subject to such forces as to deform the tread toward the outside of the tire. Therefore it is known that the two peaks correspond to the bulge points.

The deformation speed at the edge of the contact patch of the tread 3, which is proportional to the magnitude of time change in the amount of radial deformation, is obtained by calculating a differentiated waveform, which is a time-series waveform of values of differentiated acceleration, by the differentiated waveform calculating means 14.

Figure 4:
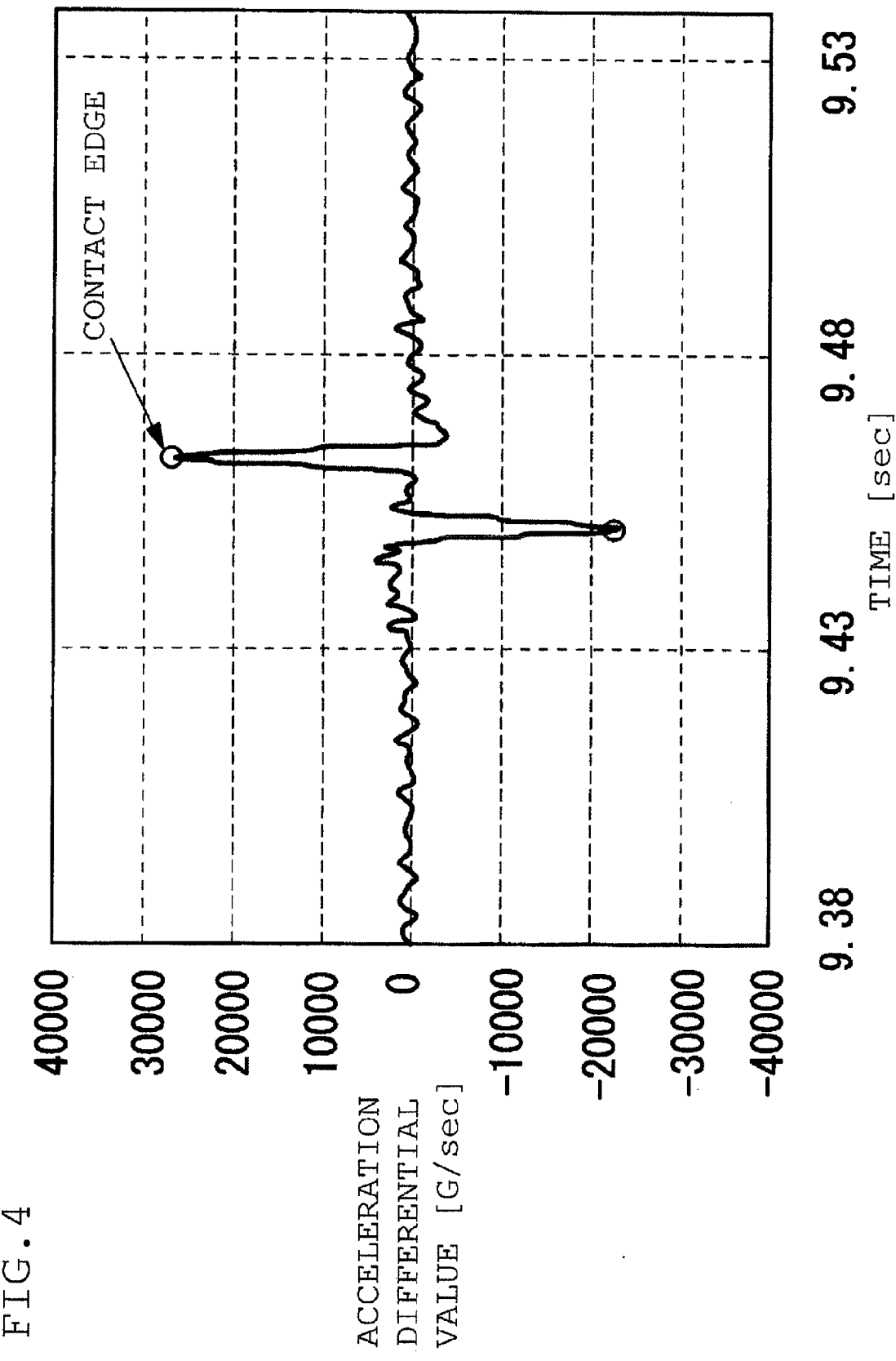
FIG. 4 is a diagram showing a differentiated waveform of radial acceleration of a tire.

FIG. 4 is a diagram showing an example of a differentiated waveform, the horizontal axis representing time (sec) and the vertical axis the magnitude (G/sec) of the differential value of radial acceleration. The two peaks (leading edge peak and trailing edge peak) of the differentiated waveform are the points where the radial force the tread receives is changing most drastically, and the magnitudes of the peaks are proportional to the deformation speed at the contact edge portions.

The deformation speed calculating means 15 detects the level (absolute value) of the leading edge peak out of the two peaks as an index V of deformation speed and outputs this index V of deformation speed to the wear estimating means 18

It should be noted that although peak detection depends on the sensitivity of the acceleration sensor 11, more constant data can be obtained if peaks are detected through a proper low-pass filter. In other words, wear estimation can be carried out with greater constancy. Also, the time interval between the peaks varies greatly with tire speed, and hence a more reliable estimation can be performed by changing the frequency of the low-pass filter according to the tire speed, thereby creating a similar waveform for each speed.

Also, the time interval between the two peaks of the differentiated waveform corresponds to the contact time of the tread. The load estimating means 17 calculates a contact time from the time interval between the two peaks of the differentiated waveform and further calculates a contact length L by multiplying the contact time by the tire speed. In the present embodiment, the tire speed is calculated using the rotation time of a wheel detected by the wheel speed sensor 12 and the rotation length coefficient of the tire.

The wear estimating means 18 estimates the degree of wear of the tire using the index V of deformation speed calculated by the deformation speed calculating means 15 and the M-V map 16B showing a relationship between the degree M of tire wear and the index V of deformation speed which has been stored in the storage means 16.

It is to be noted that the peak level used as the index V of deformation speed exhibits a slight load dependence. In the present embodiment, therefore, the degree M of tire wear is corrected on the basis of the load W estimated by the load estimating means 17.

The relationship between the degree M of tire wear and the level of the leading edge peak, which is the value of the index V of deformation speed, has been derived from the results of the following test.

Four types of test tires as described below were prepared in order to investigate the effects of not only the different amounts of wear but also the different forms of wear. It goes without saying that there are variations in the wear mode of tires in the market, and it is important that the estimation errors be made small for different forms of wear.

Test tire 1 is a new tire, and the depth of circumferential grooves 5 near the center as shown in FIG. 2 is about 8 mm.

Test tire 2 is a tire which has a remaining depth of circumferential grooves 5 near the center of about 4 mm and shows signs of shoulder wear.

Test tire 3 is a tire which has a remaining depth of circumferential grooves 5 near the center of about 4 mm and shows signs of center wear, which means not much wear in the shoulder region 6.

Test tire 4 is a tire which has a remaining depth of circumferential grooves 5 near the center of about 2 mm and shows an almost uniform wear down to a level near the slip sign.

The above-cited test tires 1 to 4 were run at a speed of 40 km per hour on a flat belt testing machine. Then the acceleration in the radial direction of the tires was measured, and the level of the leading edge peak calculated using the differentiated waveform of acceleration. The tire size used was 205/65R15, and the internal pressure was 230 kPa. And the load was changed from 3 kN to 7 kN in increments of 1 kN.

Figure 5:
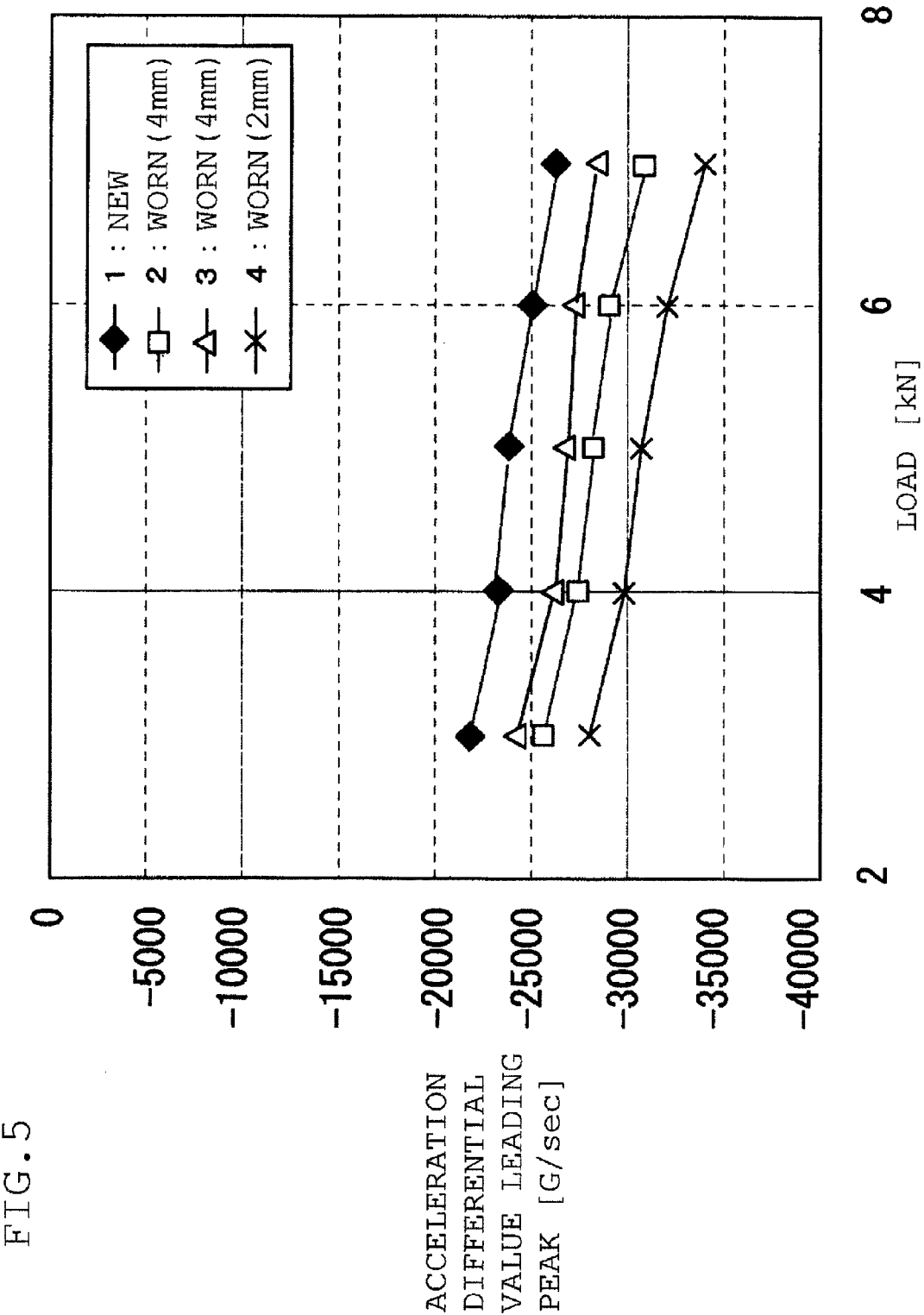
FIG. 5 is a graph showing the relationship between the level of leading edge peak in the differentiated waveform of radial acceleration and the degree of wear.

FIG. 5 is a graph plotting the levels (G/sec) of leading edge peaks of test tires 1 to 4 when the load (kN) is changed. From this graph, it is found that while a slight load dependence is evident, the higher the degree M of wear is, the larger the absolute values of the leading edge side peak levels will be.

Also, test tire 2 marked with □ and test tire 3 marked with Δ in the figure have different forms of wear from each other, but the difference between them is small. And the lines of test tire 2 and test tire 3 are plotted nearly midway between the line of the new tire marked with ♦ and the line of the tire with a remaining groove depth of about 2 mm marked with X. Also, test tire 2, which has about the same wear in the center but more wear in the shoulder, that is, more wear in the tread as a whole, shows a greater deformation speed than test tire 3. Accordingly, it is possible to estimate the level of wear with constancy regardless of differences in the wear mode if wear estimation is performed by calculating the leading edge side peak level determined from the differentiated waveform of radial acceleration of the tire tread and using it as the index V of deformation speed. Also, it is possible to further enhance the estimation accuracy of wear level if a correction is made based on load using the graph of FIG. 5.

It is to be noted also that as the tire speed rises, the effects of centrifugal force on tire deformation will become greater, and this in turn will change the relationship between contact length L and load W also. Therefore, wear estimation with more constant accuracy can be realized if an upper limit is set for the tire speed and estimation is done on the lower-speed side. Also, since the progress of wear is extremely slow, there is no practical problem with inability to estimate tire wear while the vehicle is running at high speeds. It is preferable therefore that tire wear is measured at vehicular speeds of 100 km/h or below because above this speed there will be greater effects of centrifugal force on the dynamic radius of the tire although they may differ between types of tires. Note that the tests conducted by changing the tire speed have confirmed that the lines described above remain stable in the range up to 100 km per hour.

According to Embodiment 1 as described above, an acceleration sensor 11 is installed on the inner surface side of the inner liner region 2 of the tire 1, and the radial acceleration of the tire tread 3 is detected. Then a peak level on the leading edge side of the tire tread 3 that appears in the differentiated waveform of detected acceleration is calculated so as to use it as the index V of deformation speed of the tread of the tire. And the degree of wear of the tire is estimated using the index V of deformation speed thus calculated and the M-V map 16B showing a predetermined relationship between the degree M of tire wear and the index V of deformation speed. Consequently, the wear of a tire can be estimated with excellent accuracy regardless of differences in the wear mode. At this time, if the load W is estimated by obtaining the contact length L of the tire from the interval between two peaks appearing in the differentiated waveform and the degree of wear of the tire is corrected according to the estimated load W, then the degree of wear of the tire can be estimated with even higher accuracy.

Also, the acceleration sensor 11, which is not exposed on the contact patch, not only improves durability feature but also enables estimation of tire wear without compromising grip force and other tire performances.

Figure 6:
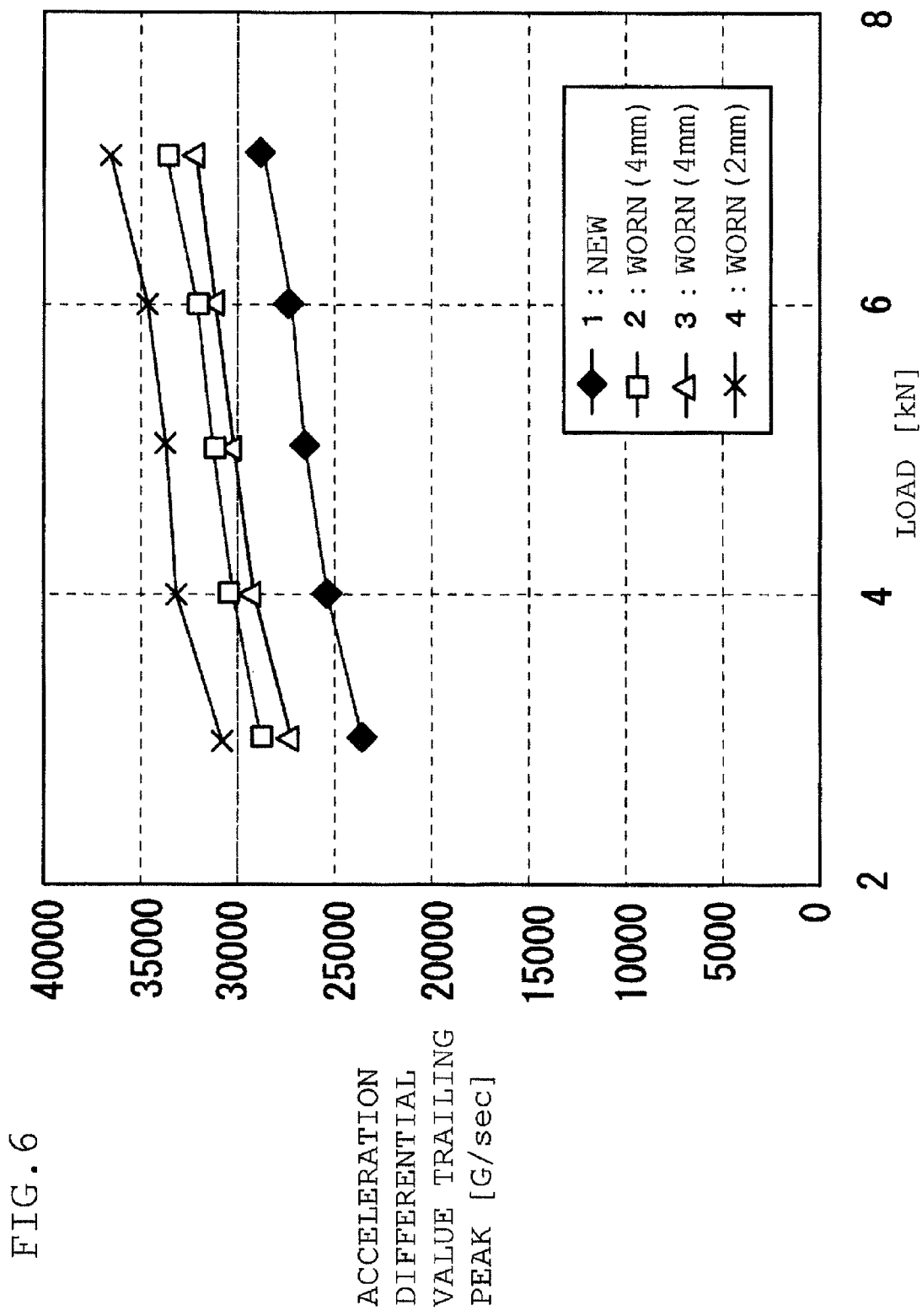
FIG. 6 is a graph showing the relationship between the level of trailing edge peak in the differentiated waveform of radial acceleration and the degree of wear.

In Embodiment 1, the peak level on the leading edge side is calculated and the value is used as the index V of deformation speed of the tire tread. However, the arrangement may also be such that the peak level on the trailing edge side is calculated and the value is used as the index V of deformation speed. FIG. 6 is a graph plotting the levels of trailing edge peaks of test tires 1 to 4 when the load (kN) is changed. The tests were conducted by the same method as in the above embodiment.

From this graph, it is found that the trailing edge peak level has a slight load dependence, but the greater the degree M of wear is, the higher the level of trailing edge peak will be. Hence, the degree of tire wear can also be estimated with excellent accuracy by calculating the trailing edge peak level and using it as the index V of deformation speed.

Also, in the above embodiment, the acceleration in the radial direction of the tire tread 3 is detected and the index V of deformation speed is calculated. However, the arrangement may also be such that the acceleration sensor 11 detects the acceleration in the circumferential direction of the tire and the circumferential acceleration at the contact edge portion of the tread is detected.

Figure 7:
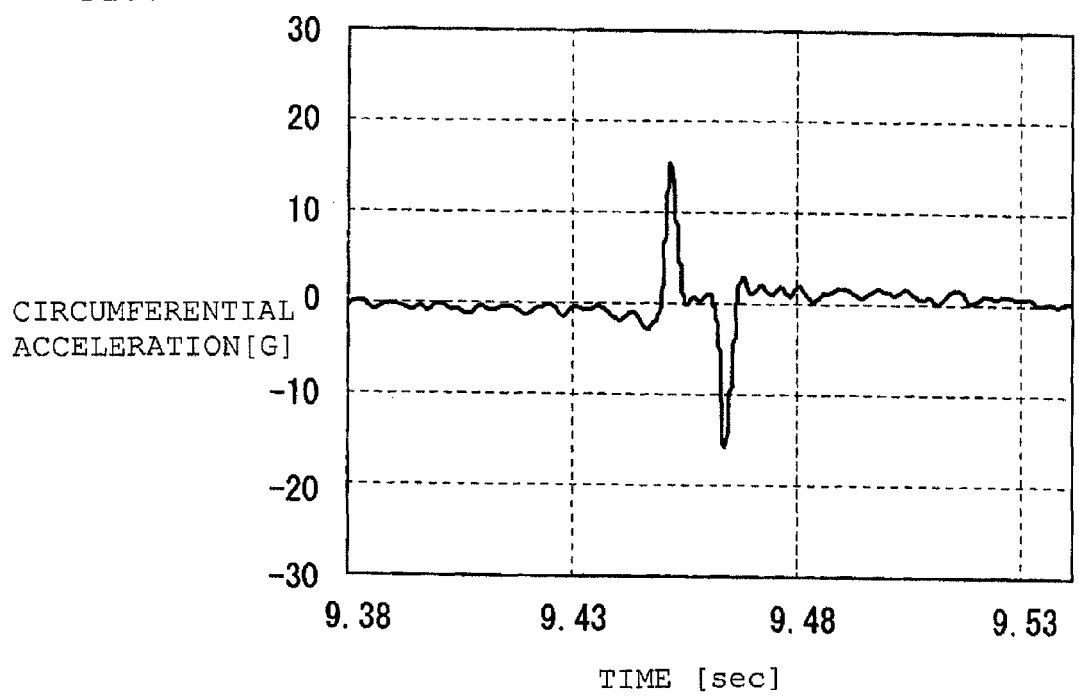
FIG. 7 is a diagram showing a waveform of circumferential acceleration of a tire.

FIG. 7 is a diagram showing a time-series waveform of circumferential acceleration of a tire. When the acceleration in the circumferential direction of the tire is to be used, the peak level on the leading edge side or the peak level on the trailing edge side appearing in the circumferential acceleration waveform may be used directly instead of the peak in the differentiated waveform. In this case, although the direction of acceleration is circumferential, the magnitude thereof changes in association with the deformation speed in the radial direction of the tire, so that the circumferential acceleration of the tire is also information on the radial deformation speed.

Figure 8:
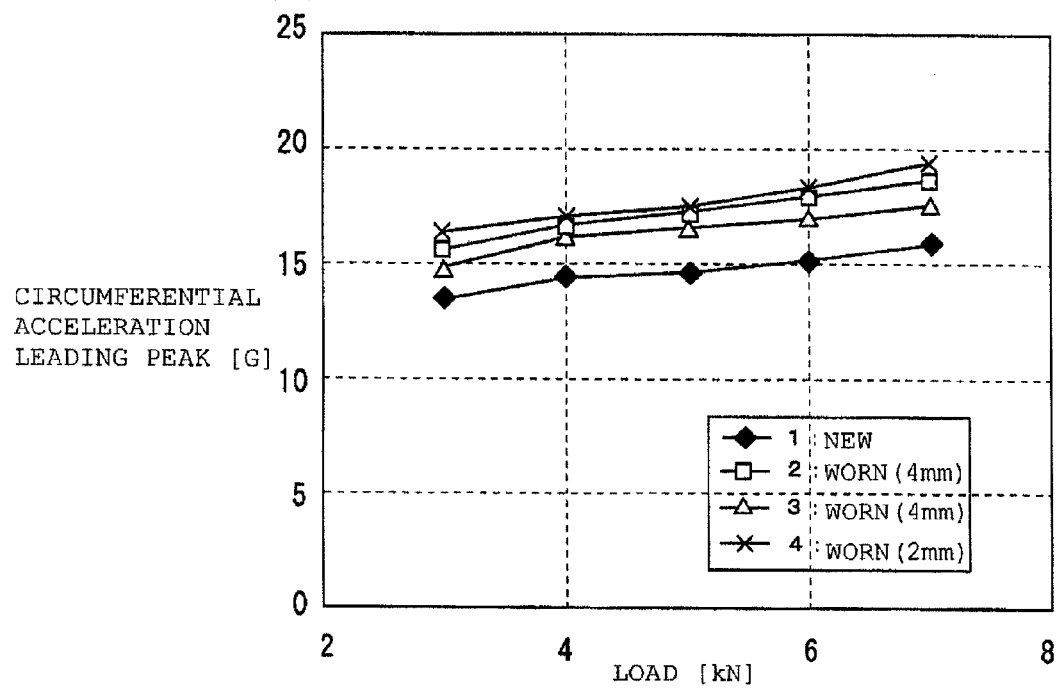
FIG. 8 is a graph showing the relationship between the level of leading edge peak in the waveform of circumferential acceleration and the degree of wear and a graph showing the relationship between the level of trailing edge peak therein and the degree of wear.
Figure 8:
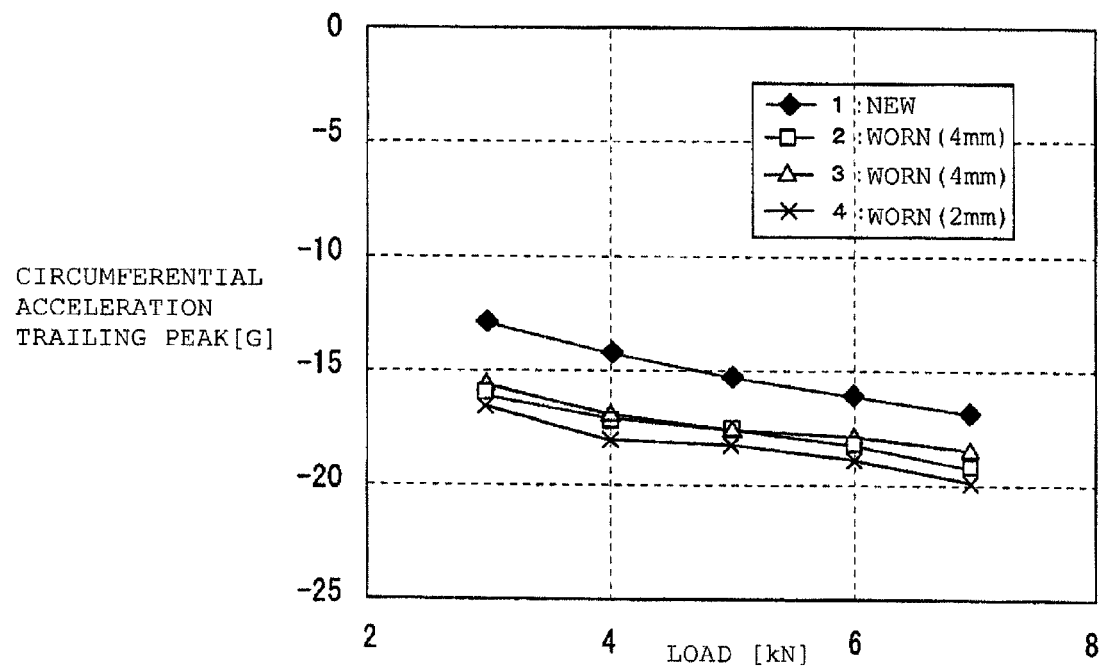

FIG. 8A is a graph plotting the levels of leading edge peaks of test tires 1 to 4 when the load (kN) is changed, and FIG. 8B is a graph plotting the levels of trailing edge peaks thereof. The tests were conducted by the same method as in the above embodiment.

From these graphs, it is found that both the leading edge side peak levels and the trailing edge peak levels have a slight load dependence, but the higher the degree M of wear is, the larger the absolute values of the peak levels will be. Hence, the degree of tire wear can also be estimated with excellent accuracy by calculating the leading edge side peak level or the trailing edge peak level from the time-series waveform of the circumferential acceleration of a tire and using it as the index V of deformation speed.

Also, both the leading edge side peak level and the trailing edge peak level may be calculated, and the sum of the absolute values of the leading edge side peak level and the trailing edge peak level or the average value of the absolute values thereof may be used as the index V of deformation speed.

Also, in the above embodiment, an acceleration sensor 11 is placed in the axial (tire width) center on the inner surface of the inner liner region 2 of the tire 1, as shown in FIG. 2. However, the same effect can be obtained even when the acceleration sensor 11 is placed in a position radially outside of the inner liner region 2 and yet radially inside of the belt layer or in a position radially outside of the belt layer and yet radially inside of the groove formed in the tread rubber. Nevertheless, from the viewpoint of durability and easy installation, it is more advantageous for the acceleration sensor to be mounted on or near the inner surface of the inner liner region 2 as in the present embodiment.

Also, in the above embodiment, the speed of a tire is detected using a wheel speed sensor 12. However, the arrangement may also be such that the vehicle speed is measured by a speed sensor or an acceleration sensor installed on the vehicle body and the contact length is obtained from the vehicle speed.

Since peaks of the acceleration waveforms or the differentiated waveforms appear repeatedly in each revolution of a tire, the arrangement may be such that the tire speed is calculated using the time interval of the peaks and the rotation length coefficient of the tire.

Figure 9:
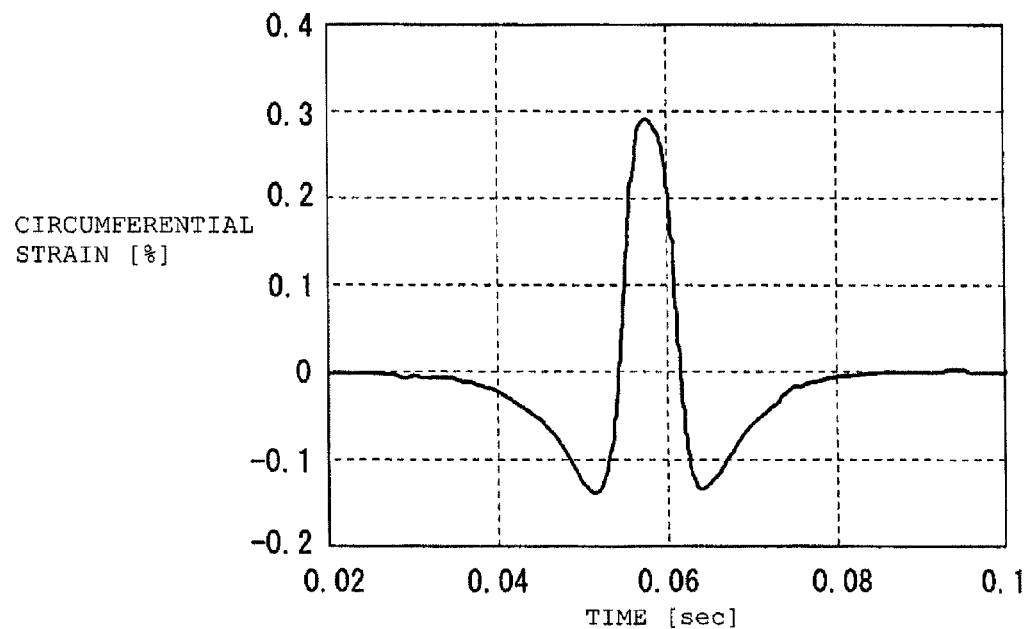
FIG. 9 is a diagram showing a waveform of circumferential strain and a diagram showing a differentiated waveform of the strain waveform.
Figure 9:
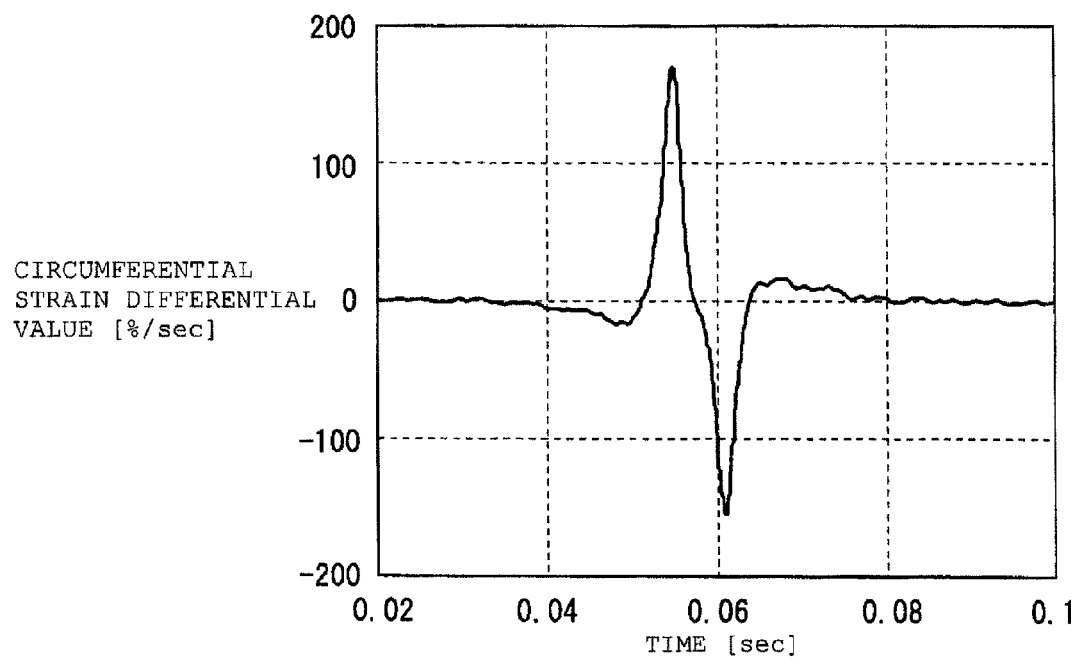

Also, in the above embodiment, tire wear is estimated from the differentiated waveform of radial acceleration of a tire detected by an acceleration sensor 11. However, the arrangement may also be such that a strain sensor is installed instead of the acceleration sensor 11 and tire wear is estimated by detecting the strain waveform in the circumferential direction of the tire. FIG. 9A is a diagram showing an example of a circumferential strain waveform, and FIG. 9B a diagram showing a differentiated waveform thereof. On the contact edge sides of the tread, the radial acceleration of the tire is positive, and therefore the tread deforms toward the outside of the tire. At this time, the circumferential strain of the tire becomes negative because the inner surface side of the tire is compressed and bent with the belts serving as the neutral axis. Since the point where the force in the radial direction of the tire changes most is also the point where the circumferential strain of the tire changes most, the level of the peak appearing in the differentiated waveform of the circumferential strain as shown in FIG. 9B may be calculated and the value may be used as the index V of deformation speed. That is, the level of the peak appearing in the differentiated waveform of the circumferential strain of the tire is also information on the radial deformation speed at the contact edge portion, so that the degree of tire wear can be estimated with excellent accuracy by using this index V of deformation speed.

Embodiment 2

In Embodiment 1 heretofore described, the degree of wear of a tire is estimated by calculating the index V of deformation speed at the contact edge portion of the tire tread from a differentiated waveform of the radial acceleration of the tire detected by an acceleration sensor 11. However, it is also possible to estimate the degree of tire wear by calculating the index Y of the amount of deformation in the radial direction of the tire at the bulge point of the tread from the radial acceleration waveform of the tire.

Figure 10:
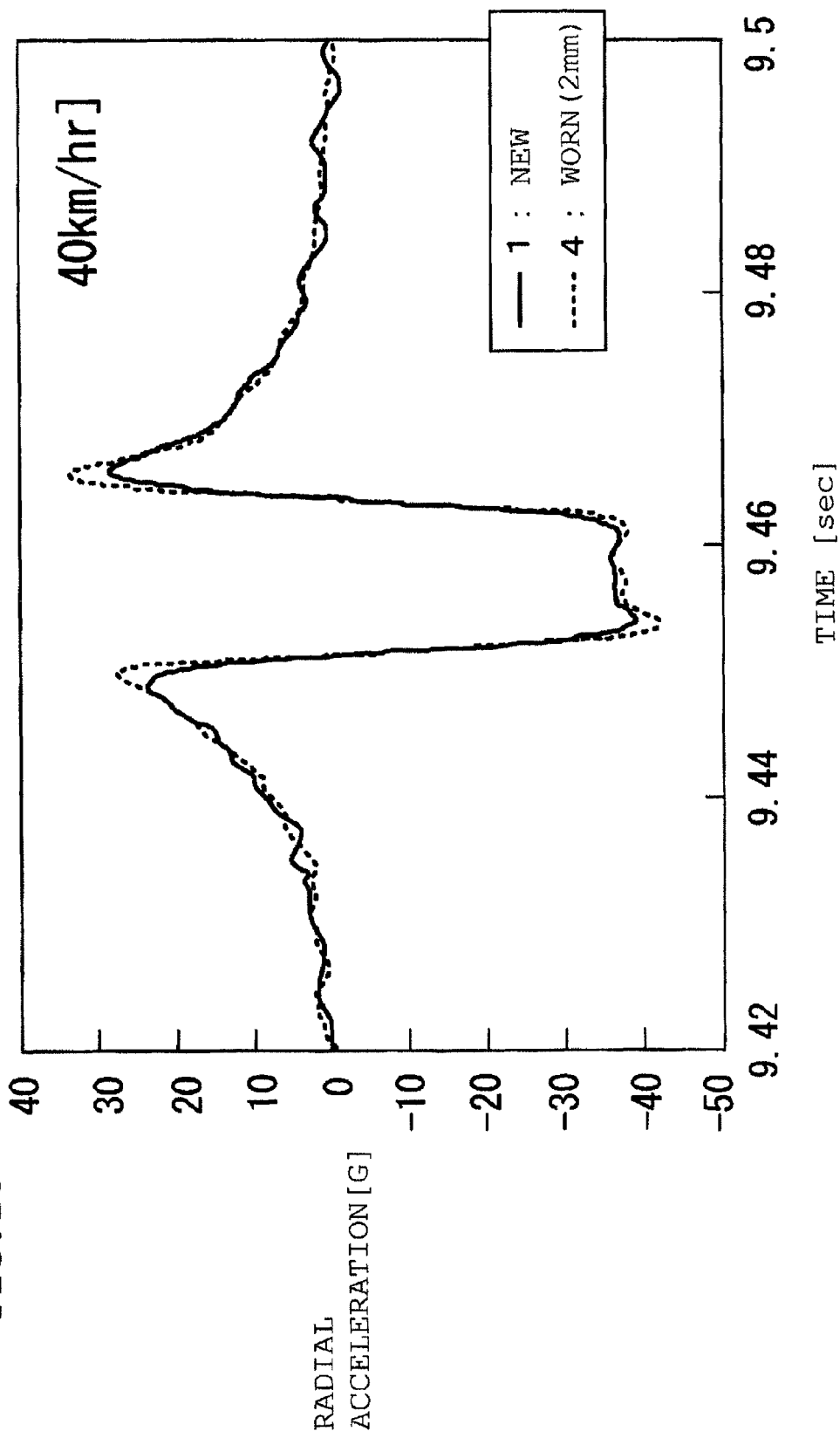
FIG. 10 is a diagram comparing a radial acceleration waveform of a new tire with a radial acceleration waveform of a worn tire.

FIG. 10 is a diagram comparing radial acceleration waveforms of the tire tread of summer tires. The tires of 205/65R15 size were run on a flat-belt testing machine under the conditions of a speed of 40 km/h, a load of 5 kN, and an internal pressure of 230 kPa. The horizontal axis represents time (sec), and the vertical axis the magnitude (G) of acceleration in the radial direction of the tire. In the figure, the solid line represents the data of a new tire, which was equivalent to the aforementioned test tire 1, whereas the broken line represents a worn tire, which was equivalent to the aforementioned test tire 4.

The vicinities of the two positive-side peaks are outside the contact patch and are receiving a force that deforms the tread toward the outside of the tire, which indicates that these two peaks correspond to the bulge points. The levels at the bulge points are proportional to the magnitude of the force the tread receives, namely, the amount of deformation on the contact edge side of the tire tread. Therefore, if the leading edge side peak level or the trailing edge peak level of a radial acceleration waveform of the tread is calculated and the calculated value is used as the index Y of deformation amount on the contact edge side of the tire tread, then the degree of tire wear can be estimated from the index Y of the amount of deformation because the higher the degree of tire wear is, the larger the index Y will be as shown in FIG. 10.

Figure 11:
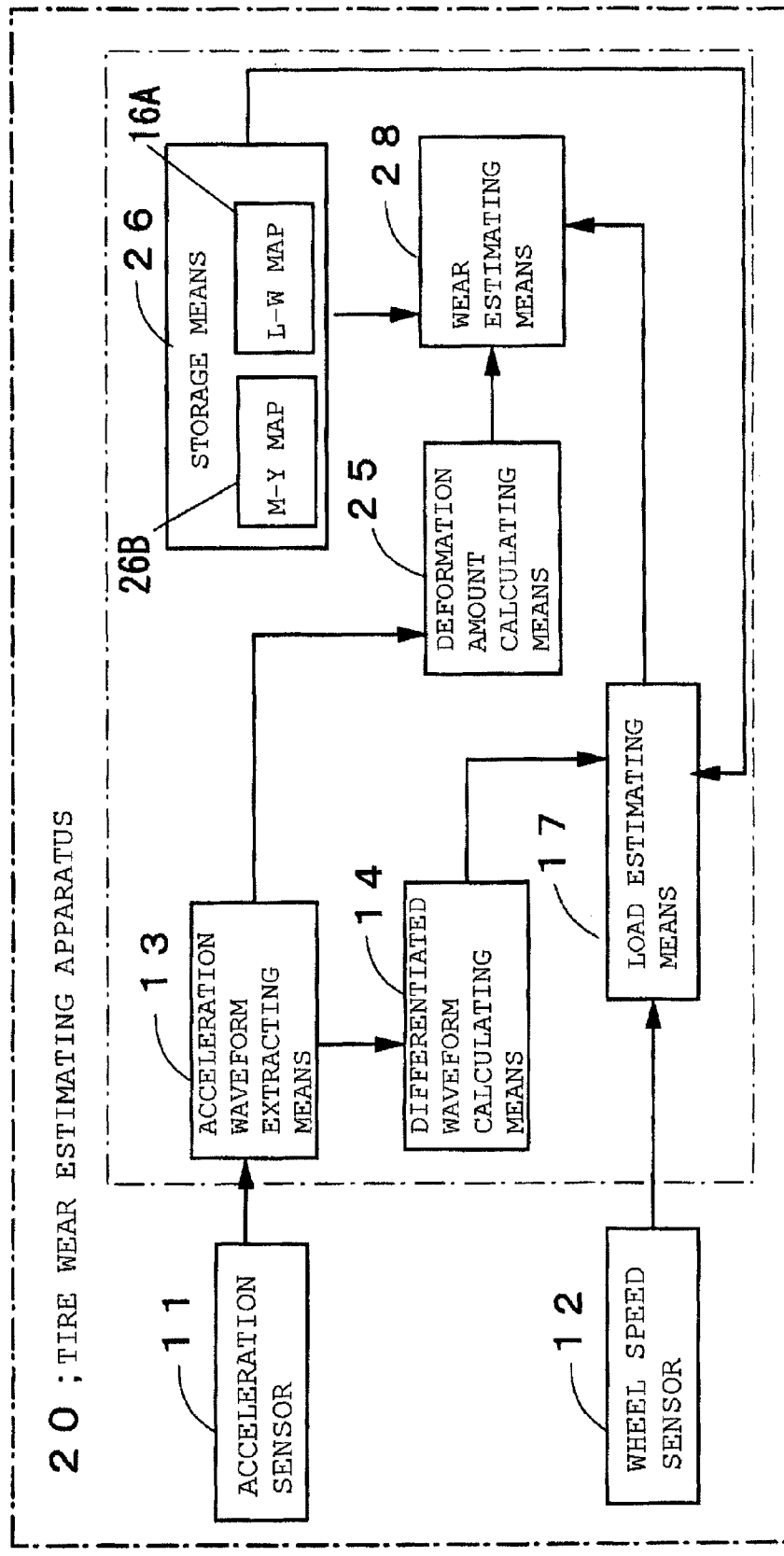
FIG. 11 is a functional block diagram showing a structure of a tire wear estimating apparatus according to Embodiment 2 of the present invention.

FIG. 11 is a functional block diagram showing a structure of a tire wear estimating apparatus 20 according to Embodiment 2 of the present invention. In the present embodiment, a deformation amount calculating means 25, which calculates the peak level at the bulge point on the leading edge side appearing in the acceleration waveform and outputs the calculated peak level as the index Y of deformation amount of the tire, is installed in the place of the deformation speed calculating means 15 of the tire wear estimating apparatus 10 shown in FIG. 1. Also, a storage means 26, which stores a predetermined L-W map 16A showing a relationship between contact length L and load W and a predetermined M-Y map 26B showing a relationship between the degree M of tire wear and the index Y of the amount of deformation, is installed in the place of the storage means 16. Also, a wear estimating means 28 is installed in the place of the wear estimating means 18. And the degree of wear of a tire is estimated from the index Y of the amount of deformation calculated by the deformation amount calculating means 25 and the M-Y map 26B.

With the tire wear estimating apparatus 20 configured as described above, the degree of tire wear is estimated by calculating the index Y of the amount of deformation of the tire tread using a radial acceleration waveform of the tire detected by the acceleration sensor 11.

In preparing the M-Y map 26B, the relationship between the degree M of tire wear and the leading edge side peak level of the radial acceleration waveform, which is the value of the index Y of deformation speed, can be determined by tests using the aforementioned four types of test tires 1 to 4 in the same way as in Embodiment 1.

In Embodiment 2, the leading edge side peak level of the radial acceleration waveform of a tire is calculated and the value is used as the index Y of deformation amount of the tire tread. However, the arrangement may also be such that the trailing edge peak level is calculated and the value is used as the index Y of deformation speed.

Also, a strain sensor may be installed in the place of an acceleration sensor 11, and the tire wear may be estimated by detecting a circumferential strain waveform of the tire. In this case, the peak level on the negative side among the peaks of the circumferential strain waveform shown in FIG. 9A may be used as the index Y of the radial deformation amount of the tire, and the degree of wear of the tire may be estimated using this index Y of the amount of deformation.

Embodiment 3

Figure 12:
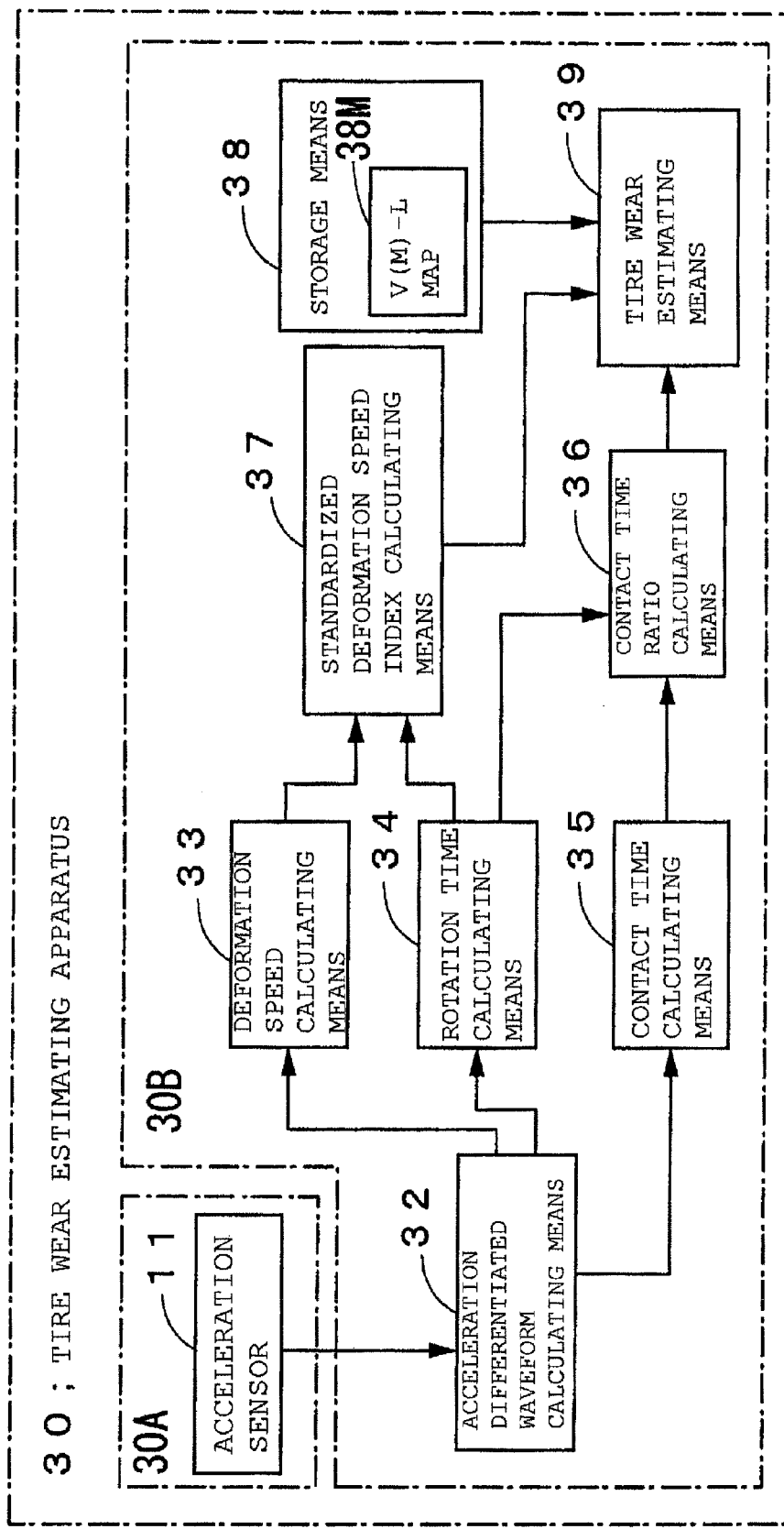
FIG. 12 is a functional block diagram showing a structure of a tire wear estimating apparatus according to Embodiment 3 of the present invention.

FIG. 12 is a functional block diagram showing a structure of a tire wear estimating apparatus 30 according to Embodiment 3 of the present invention. In the figure, reference numeral 11 denotes an acceleration sensor, 32 an acceleration differentiated waveform calculating means, 33 a deformation speed calculating means, 34 a rotation time calculating means, 35 a contact time calculating means, 36 a contact time ratio calculating means, 37 a standardized deformation speed index calculating means, 38 a storage means, and 39 a tire wear estimating means.

In the same way as in Embodiment 1 and Embodiment 2, the acceleration sensor 11 detects the acceleration of the inner surface of the tire tread. And this acceleration sensor 11 constitutes a sensor section 30A of the tire wear estimating apparatus 30 according to the present invention, and the component means from the acceleration differentiated waveform calculating means 32 to the wear estimating means 39 constitute a calculating section 30B thereof.

In this embodiment, as shown in FIG. 2, the acceleration sensor 11 is placed at the axial center in the inner liner region 2 of a tire 1 such that detection can be made in the radial direction of the tire, and the radial acceleration working on the inner surface of the tire tread 3 is detected. Also, the calculating section 30B is placed on the not-shown vehicle body.

As an arrangement for sending output signals of the acceleration sensor 11 to the calculating section 30B, it is preferable that a transmitter 11F is installed in the inner liner region 2 or on a wheel 4 as shown in FIG. 2, for instance, and the output signals of the acceleration sensor 11, after they are amplified by a not-shown amplifier, are transmitted to the calculating section 30B placed on the vehicle body wirelessly. The arrangement may also be such that the calculating section 30B is installed on the tire 1 and the results of estimation by the tire wear estimating means 39 are transmitted to a not-shown vehicle control unit on the vehicle body.

The acceleration differentiated waveform calculating means 32 obtains a differentiated waveform of radial acceleration by temporally differentiating the time-series waveform of radial acceleration working on the tread 3 detected by the acceleration sensor 11.

Figure 14:
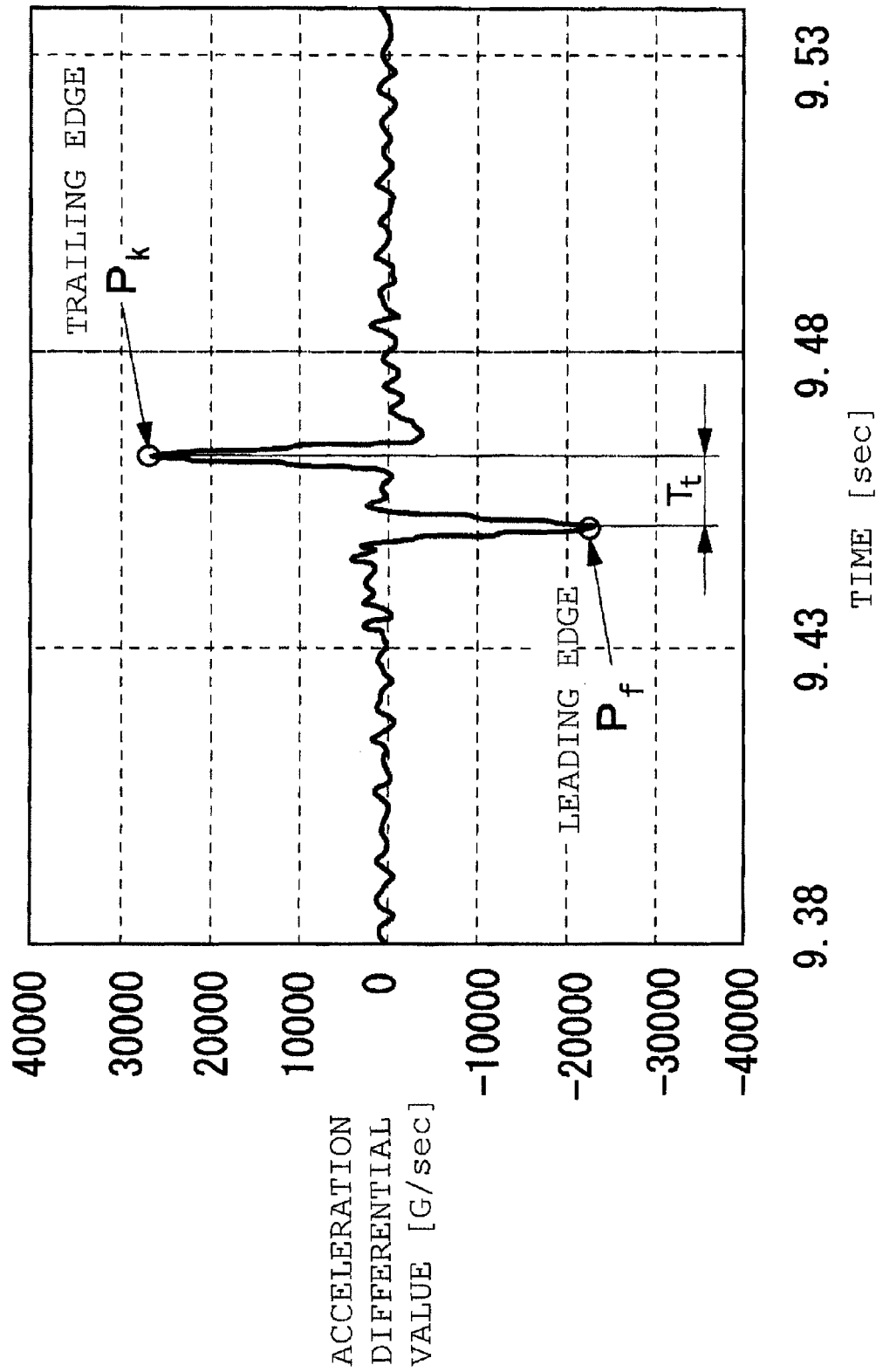
FIG. 14 is a diagram showing a differentiated waveform of radial acceleration of a tire.

The deformation speed calculating means 33 calculates the differential peak values which are the values of two peaks (leading edge peak $P_f$ and trailing edge peak $P_k$ shown in FIG. 14) appearing in the differentiated waveform of radial acceleration. In the present embodiment, the differential peak value of the leading edge peak $P_f$ is used as the deformation speed $V_{tf}$ of the tread on the leading edge side, and the differential peak value of the trailing edge peak $P_k$ as the deformation speed $V_{tk}$ of the tread on the trailing edge side.

The rotation time calculating means 34 calculates the time difference between time $T_1$ at which the trailing edge peak of the two peaks appears and time $T_2$ at which the trailing edge peak appears again after one revolution of the tire 1 ($T_r = T_2 - T_1$). This time difference $T_r$ is the rotation time required by the tire to make one revolution. Hereinafter, the $T_r$ is referred to as the rotation time.

The contact time calculating means 35 calculates the contact time $T_t$, which is the time between the two peaks corresponding to the deformations at the contact edges of the tread 3.

The contact time ratio calculating means 36 calculates the contact time ratio by dividing the contact time $T_t$ by the rotation time $T_r$. In this embodiment, the contact time ratio is used as the index $L_t$ of contact length.

The standardized deformation speed index calculating means 37 calculates the standardized deformation speed $V''_{tf}$ on the leading edge side and the standardized deformation speed $V''_{tk}$ on the trailing edge side by standardizing the deformation speed $V_{tf}$ on the leading edge side and the deformation speed $V_{tk}$ on the trailing edge side, respectively, calculated by the deformation speed calculating means 33 using the information on the rotation time $T_r$ calculated by the rotation time calculating means 34 and at the same time calculates the standardized index of deformation speed (standardized deformation speed index) $V''_t$ by averaging the standardized deformation speed $V''_{tf}$ on the leading edge side and the standardized deformation speed $V''_{tk}$ on the trailing edge side.

The storage means 38 stores a map (V(M)-L map) 38M showing the relationship between the standardized index $V''_t$(M) of deformation speed and the index $L_t$(M) of contact length, determined in advance for different degrees M of tire wear.

The tire wear estimating means 39 estimates the degree M of tire wear from the standardized deformation speed index $V''_t$ calculated by the standardized deformation speed index calculating means 37, the index $L_t$ of contact length calculated by the contact time ratio calculating means 36, and the map 38M.

Now a tire wear estimating method according to Embodiment 3 will be explained.

First the acceleration in the radial direction of the inner surface of the inner liner region 2 which deforms along with the deformation of the tread 3 is detected by the acceleration sensor 11, and the detected acceleration, after it is amplified by a not-shown amplifier, is transmitted from a transmitter 11F installed in the inner liner region 2 to the calculating section 30B placed on the vehicle body. The acceleration differentiated waveform calculating means 32 of the calculating section 30B determines a differentiated waveform of radial acceleration by temporally differentiating the time-series waveform of the detected radial acceleration. Note that this differentiated waveform of radial acceleration is also a time-series waveform.

Figure 13:
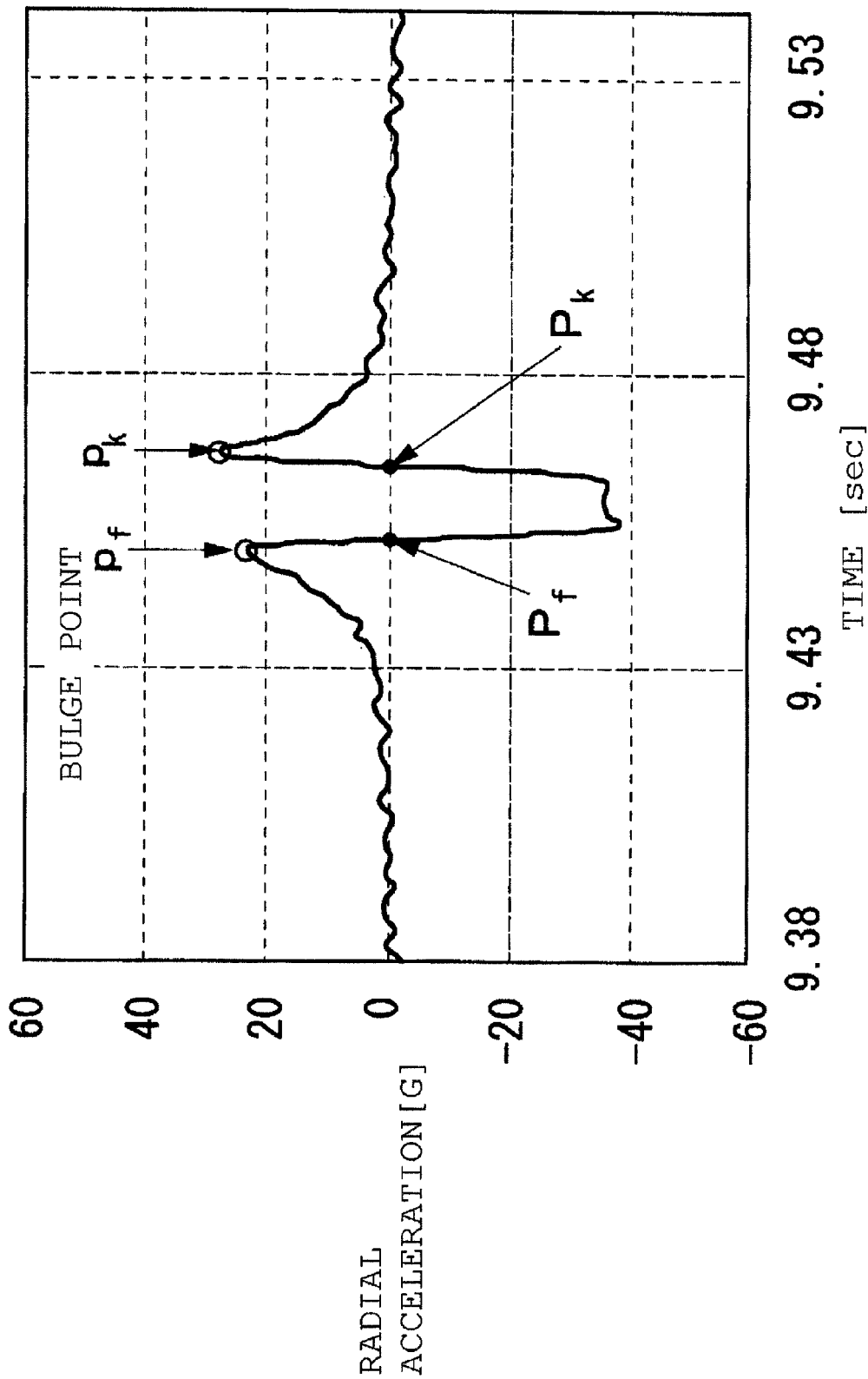
FIG. 13 is a diagram showing a radial acceleration waveform of a tire detected by an acceleration sensor.

FIG. 13 is a diagram showing an example of a radial acceleration waveform detected by an acceleration sensor, the horizontal axis representing time (sec) and the vertical axis the magnitude (G) of radial acceleration. In the test, summer tires of 205/65R15 size, with an acceleration sensor installed at the axial center on the inner liner region, were run on a flat belt testing machine under the conditions of a speed of 40 km/h, a load of 5 kN, and an internal pressure of 230 kPa. When the acceleration is of a positive value, the acceleration is occurring in the direction of the outside of the tire, and when it is of a negative value, the acceleration is occurring in the direction of the tire center. These accelerations are occurring substantially in proportion to the forces the tire tread is receiving in the radial direction and are proportional to the amount of radial deformation. The vicinities of the two peaks $p_f$ and $p_k$ on the positive side of the radial acceleration waveform are outside the contact patch and subject to such forces as to deform the tread toward the outside of the tire, and therefore it is known that the two peaks $p_f$ and $p_k$ are the bulge points. And the levels of these two peaks $p_f$ and $p_k$ are the indices corresponding to the amounts of tread deformation outside the contact patch.

Also, FIG. 14 is a diagram showing a differentiated waveform of the radial acceleration, the horizontal axis representing time (sec) and the vertical axis the differential value (G/sec) of radial acceleration. The two peaks $p_f$ and $p_k$ of the differentiated waveform are the points where the radial force the tread 3 receives are changing most drastically. The levels (peak values) of the peaks $p_f$ and $p_k$ correspond to the deformation speeds at the leading edge and the trailing edge, respectively, of the tire 1.

The data on the differentiated waveform of the radial acceleration are sent to each of the deformation speed calculating means 33, the rotation time calculating means 34, and the contact time calculating means 35.

The deformation speed calculating means 33 calculates each of the values (hereinafter referred to as differential peak values) $V_{tf}$ and $V_{tk}$ of the two peaks $P_f$ and $P_k$ of the differentiated waveform and sends these data as the deformation speeds $V_{tf}$ and $V_{tk}$ of the tread on the leading edge side and the trailing edge side to the standardized deformation speed index calculating means 37.

It should be noted that although peak detection depends on the sensitivity of the acceleration sensor 11, more reliable data can be obtained if peaks are detected through a proper low-pass filter. In other words, wear estimation can be carried out with greater constancy. Also, the time interval between the peaks $P_f$ and $P_k$ varies greatly with tire speed. And hence a more reliable estimation can be performed by changing the frequency of the low-pass filter according to the tire speed, thereby creating a similar waveform for each speed. Also, in the place of the above-mentioned peak values, differential values in a specific range near the peaks, especially, averaged differential values in the periphery of the peaks, may also be used as the deformation speed.

On the other hand, the rotation time calculating means 34 calculates the time difference between time $T_1$ at which the trailing edge peak $P_k$ appears and time $T_2$ at which the trailing edge peak $P_k$ appears again after one revolution of the tire 1 and sends this data as the rotation time $T_r$ of the tire 1 to the standardized deformation speed index calculating means 37. It is to be noted that the rotation time $T_r$ of the tire 1 may also be calculated using the leading edge peak $P_f$.

Also, the contact time calculating means 35 calculates the time interval $T_t$ between the two peaks $P_f$ and $P_k$ and sends the data as the contact time $T_t$ of the tire to the contact time ratio calculating means 16.

In this embodiment, therefore, the deformation speeds $V_{tf}$ and $V_{tk}$ of the tread 3, the rotation time $T_r$ of the tire, and the contact time $T_t$ of the tire can be calculated from the radial acceleration of the tire detected by the acceleration sensor 11.

It should be appreciated that the deformation speed $V_t$ of the tread changes in relation to the degree M of wear and the rotational speed $W_r$ of the tire. Hence, the following four types of test tires were prepared in order to investigate not only the amount of wear but also the effects of the wear mode.

Test tire 1 is a new tire, and the depth of circumferential grooves 5 near the center as shown in FIG. 2 is about 8 mm.

Test tire 2 is a tire which has a remaining depth of circumferential grooves 5 near the center of about 4 mm and shows signs of shoulder wear.

Test tire 3 is a tire which has a remaining depth of circumferential grooves 5 near the center of about 4 mm and shows signs of center wear, which means not much wear in the shoulder region 6.

Test tire 4 is a tire which has a remaining depth of circumferential grooves 5 near the center of about 2 mm and shows an almost uniform wear down to a level near the slip sign.

Note that these test tires 1 to 4 are identical to those used in Embodiment 1.

Figure 15:
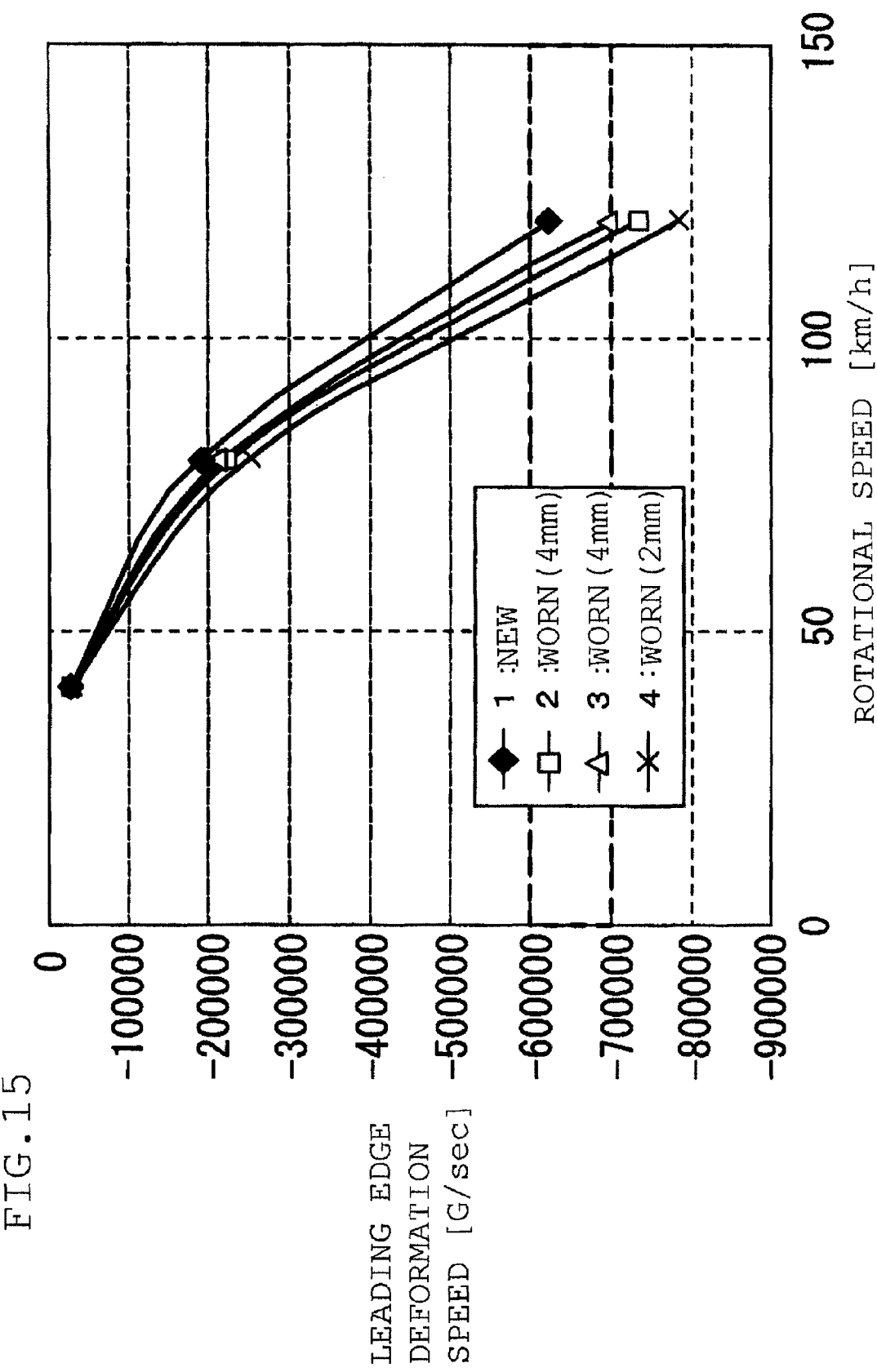
FIG. 15 is a graph showing the relationship between the rotational speed of a tire and the deformation speed of the tread.

FIG. 15 is a graph showing the results of investigation on the relationship between the rotational speed $W_r$ of the tire and the deformation speed $V_{tf}$ on the leading edge side of the tread, determined for different degrees M of tire wear, when the load is 5 kN and the tire rotational speed $W_r$ is changed from 40 to 80 to 120 km/h, using the four types of the test tires. As shown in the figure, the deformation speed $V_t$ of the tread changes considerably in relation to the rotational speed $W_r$ of the tire.

In the present embodiment, a standardized deformation speed $V''_{tf}$ is calculated by standardizing the deformation speed $V_{tf}$ using the rotation time $T_r$ calculated by the rotation time calculating means 34, and the degree M of tire wear is estimated using this standardized deformation speed $V'''_{tf}$. As already mentioned, the deformation speed is inversely proportional to the cube of the rotation time $T_r$ of the tire. In this embodiment, therefore, the standardized deformation speed $V'''_{tf}$ on the leading edge side is calculated using the following equation (1):

$$V'''_{tf} = V_{tf} \cdot T_r^3 \quad (1)$$

The standardized deformation speed $V'''_{tk}$ on the trailing edge side is also calculated in the same way.

The standardized deformation speed index to be used in estimating the degree M of tire wear may be the standardized deformation speed $V'''_{tf}$ on the leading edge side or the standardized deformation speed $V'''_{tk}$ on the trailing edge side. In this embodiment, however, the average standardized deformation speed calculated by the following equation (2) is used as the standardized deformation speed $V'''_t$:

$$V'''_t = (|V'''_{tf}| + |V'''_{tk}|)/2 \quad (2)$$

In this way, if the average standardized deformation speed, which is the average of the leading edge and trailing edge values, is used as the standardized deformation speed index $V'''_t$, then the estimation of tire wear can be carried out with better constancy because it will be less susceptible to the effects of the fore-aft forces working on the tire 1 or the attitude angle of the tire 1. Note that absolute values of $V'''_{tf}$ and absolute values of $V'''_{tk}$ are used in the calculation of the standardized deformation speed index $V'''_t$ because there is a positive-negative inversion in the sign of the deformation speed $V_t$ of the tread between the leading edge side and the trailing edge side.

Figure 16:
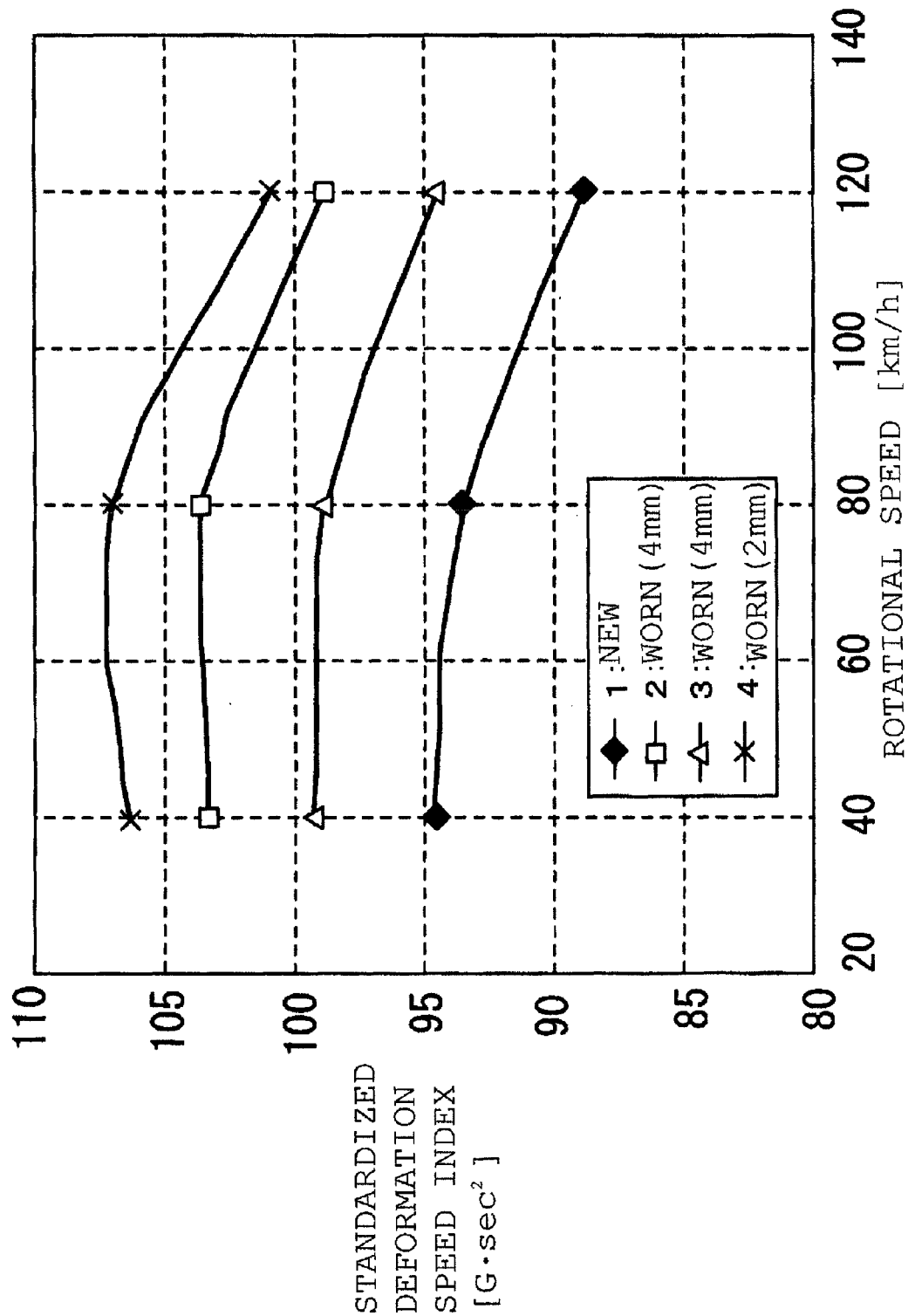
FIG. 16 is a graph showing a relationship between the rotational speed of a tire and the standardized deformation speed index.

FIG. 16 is a graph showing a relationship between the rotational speed $W_r$ of the tire and the standardized deformation speed index $V'''_t$ calculated above. The standardized deformation speed index $V'''_t$ remains nearly constant up to the tire rotational speed $W_r$ of 80 km/h, and with the progress of wear, the values of the standardized deformation speed index $V'''_t$, which are the index of deformation speed, show larger values. When the tire rotational speed $W_r$ is 120 km/h, the values of the standardized deformation speed index $V'''_t$ drop a little. This is considered due to the increased effects of centrifugal force and the effects of a change in dynamic radius of the tire. However, wear is an extremely slow change and it may not be necessary to monitor it at all times. And there is no problem with limiting the speeds at which tire wear is estimated to a lower-speed range. Accordingly, tire wear can be estimated with excellent constancy if it is done in the range of tire rotational speed $W_r$ of 100 km/h or below, and more preferably in the range of 80 km/h or below.

However, as is clear from FIG. 16, there are differences in the value of standardized deformation speed index $V'''_t$ between test tire 2 and test tire 3, which have the same remaining groove depth of 4 mm but different forms of wear. Therefore, in estimating the amount of wear near the sensor installation position, namely, the axial center position, there are possibilities of error occurring on account of the wear mode. Also, although not shown, change in the load causes change in the amount of distortion of the tire, which in turn causes change in the value of the standardized deformation speed index $V'''_t$ also. Thus, in order to reduce these effects, information on the index $L_t$ of contact length is also used in the estimation of tire wear. The index $L_t$ of contact length is calculated by the contact time ratio calculating means 36. In this embodiment, the contact time ratio $R = (T_t/T_r)$ which is obtained by dividing the contact time $T_t$ by the rotation time $T_r$ calculated by the rotation time calculating means 14 is used as the index $L_t$ of contact length. The tire wear estimating means 19 estimates the wear of the tire using data on the index $L_t$ of contact length and data on the standardized deformation speed index $V'''_t$.

Figure 17:
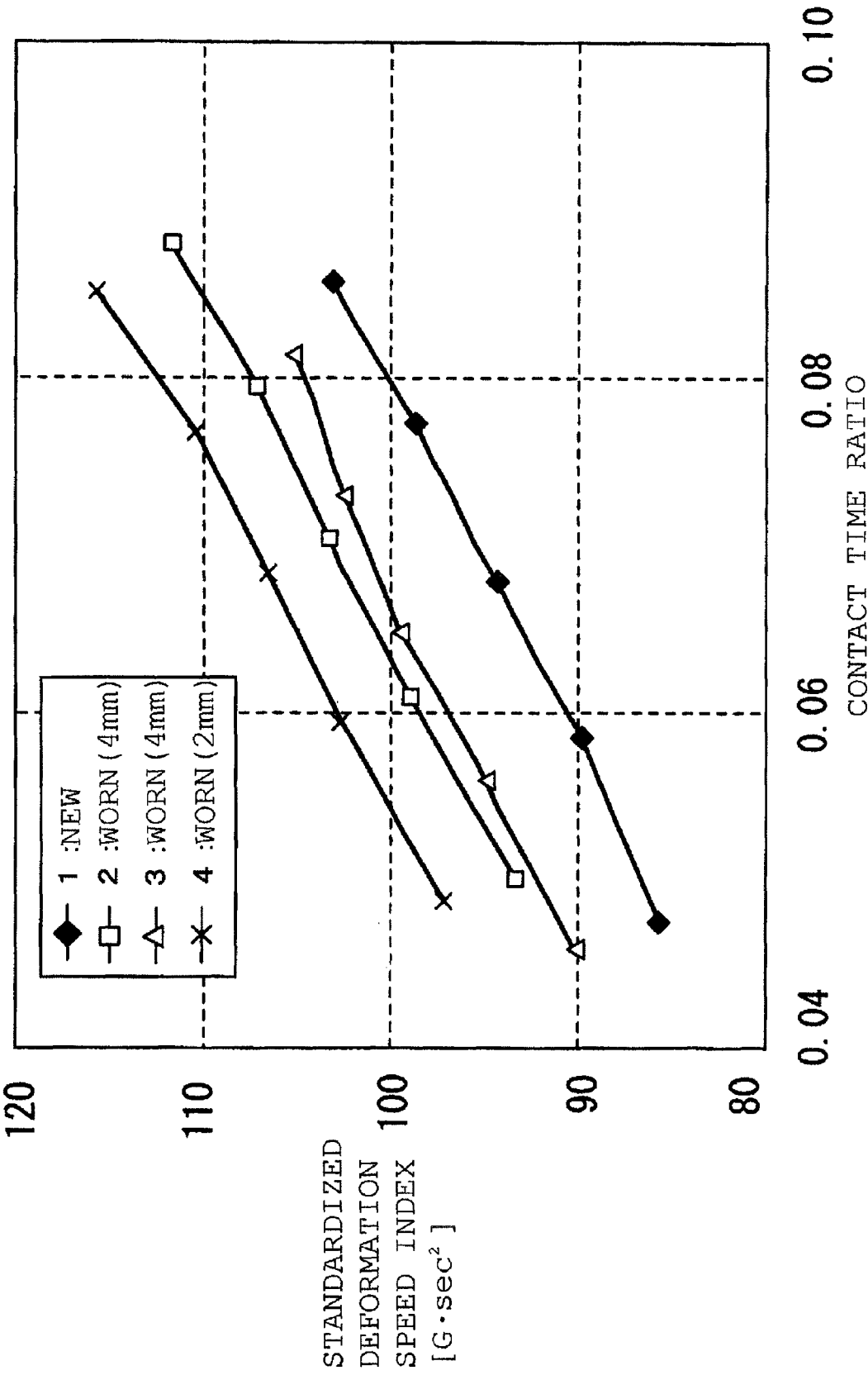
FIG. 17 is a graph showing the relationship between the contact time ratio and the standardized deformation speed index.
Figure 18:
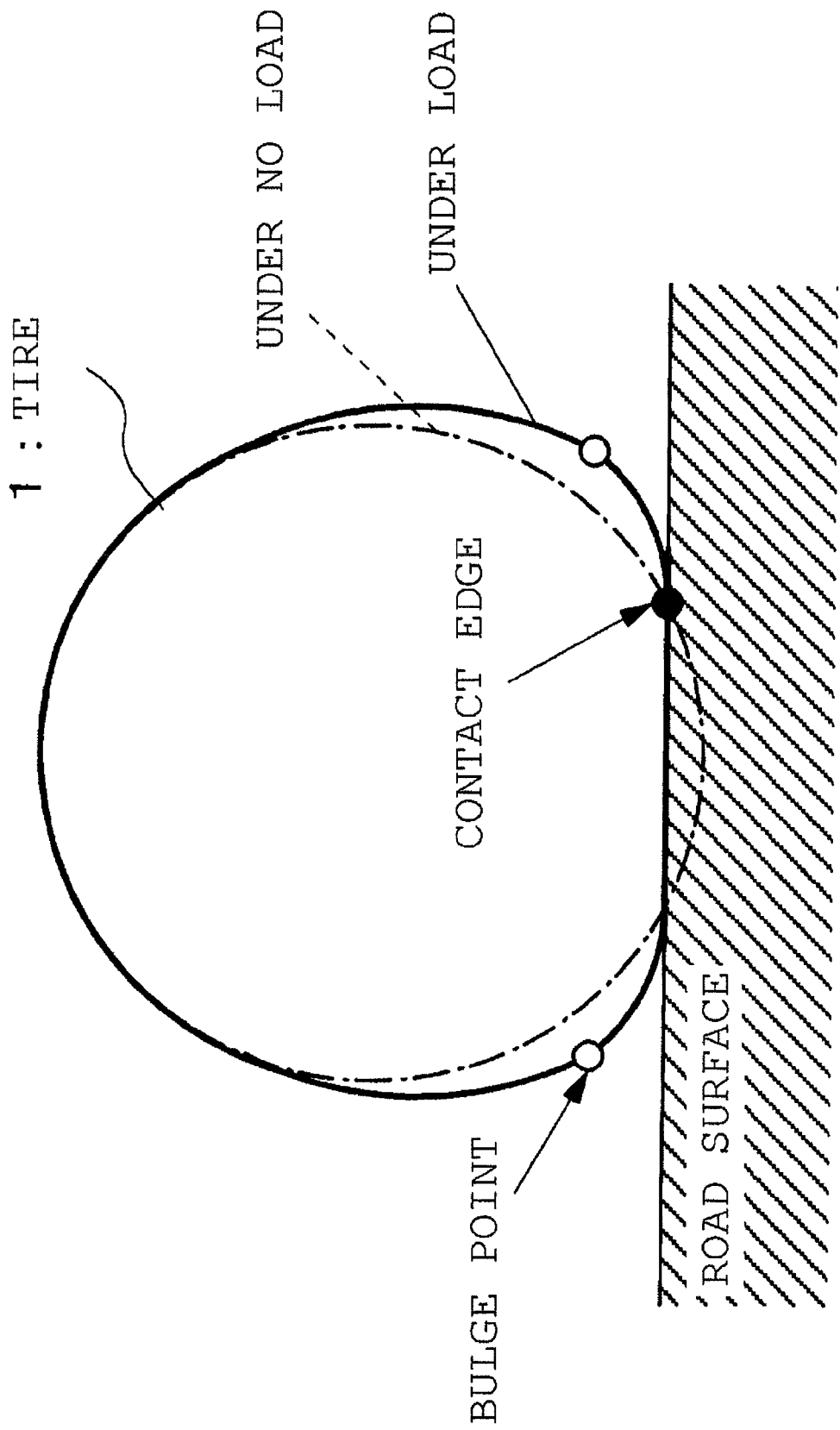
FIG. 18 is a schematic illustration showing a profile of a tire under load.

FIG. 17 is a graph showing an example of a map (V(M)-L map) 38M used in estimating tire wear, the horizontal axis representing the contact time ratio R which is the index $L_t$ of contact length and the vertical axis representing the standardized deformation speed index $V'''_t$. The tires used in preparing this map 38M were the same four types of test tires (test tires 1 to 4) used in obtaining the relationship between the rotation time $T_r$ of the tire and the deformation speed $V_{tf}$ of the tread shown in FIG. 15, and the load was changed from 3 to 7 kN in the testing. As can be seen in the figure, the lines showing the relationship between the contact time ratio R and the standardized deformation speed index $V'''_t$ are separate from each other for different amounts of wear. Thus, by comparing the contact time ratio R and the standardized deformation speed index $V'''_t$ with each other, that is, by preparing the graph as a map, it is possible to estimate the degree M of wear of a tire without regard to the effects of load. Also, in this graph, when the tires have different forms of wear but the same remaining depth (about 4 mm) of circumferential grooves near the center as in the case of test tires 2 and 3, the lines showing the relationship between the contact time ratio and the standardized deformation speed are close to each other regardless of the different forms of wear. This shows that the degree M of tire wear can be estimated with excellent constancy regardless of the different forms of wear. In this way, by the use of the index of contact length, the degree M of tire wear can be estimated with excellent accuracy even when there are differences in the wear mode such as seen in "shoulder wear" or "center wear".

In other words, when the standardized deformation speed index $V'''_t$ calculated by the standardized deformation speed index calculating means 37 is denoted by $V'''_t$ and the index of contact length calculated by the contact time ratio calculating means 30 by $L_t$, the degree M of tire wear can be estimated with excellent accuracy with the tire wear estimating means 39 checking to see on which of the plurality of lines for different degrees M of wear or between which lines $(L_t, V'''_t)$ is located in the map 38M.

According to Embodiment 3 as described above, the acceleration in the radial direction of the tread 3 is detected by an acceleration sensor 11 installed in the inner liner region 2 of the tire 1, and the levels of peaks $P_f$ and $P_k$ on the leading edge side and the trailing edge side, respectively, of the tread 3 appearing in the differentiated waveform of the detected radial acceleration are calculated and used as the deformation speeds $V_{tf}$ and $V_{tk}$ of the tire tread, respectively. At the same time, the rotation time $T_r$ of the tire is obtained from the cycle of the trailing edge peak $P_k$, and the contact time $T_t$ from the time difference between the leading edge peak $P_f$ and the trailing edge peak $P_k$. Then the standardized deformation speed index $V'''_t$ is calculated by averaging the absolute values of the standardized deformation speed $V'''_{tf}$ on the leading edge side and the standardized deformation speed $V'''_{tk}$ on the trailing edge side, which are obtained by standardizing the deformation speed $V_{tf}$ on the leading edge side and the deformation speed $V_{tk}$ on the trailing edge side using the information on the rotation time $T_r$ calculated by the rotation time calculating means 34. And the contact time ratio R obtained by dividing the contact time $T_t$ by the rotation time $T_r$ is used as the index $L_t$ of contact length, and the degree M of tire wear is estimated from the standardized deformation speed index $V'''_t$, the index $L_t$ of contact length, and the map 38M showing a predetermined relationship between the standardized deformation speed index $V''_t$ and the index $L_t$ of contact length. As a result, the wear of a tire can be estimated with excellent accuracy regardless of the differing forms of wear of the tire.

Also, since the deformation speed $V_{tj}$ (j=f, k) of the tread 3 is inversely proportional to the cube of the rotation time $T_r$ of the tire, the standardized deformation speed $V''_{tj}$ least influenced by the tire rotational speed $W_r$ can be calculated using the equation $V''_{tj}=V_{tj} \cdot T_r^3$.

Further, in the present embodiment, the deformation speed $V_{tj}$, the rotation time $T_r$, and the contact time $T_t$ can be calculated from the output of the acceleration sensor 11, which helps to make the apparatus smaller and simplify the signal processing circuit.

Also, since the acceleration sensor 11 is not exposed in the contact patch of the tire, this method for estimating tire wear excels in tire durability without the loss of tire performance such as grip force.

It should be noted that in Embodiment 3, the positions of peaks $P_f$ and $P_k$ of the differentiated waveform of radial acceleration detected by the acceleration sensor 11 as shown in FIG. 14 are assumed to be the contact edges, and the differential values of acceleration (differential peak values) at the contact edges are used as the index $V_{tj}$ (j=f, k) of deformation speed of the tread 3. However, the arrangement may also be such that the slope of the radial acceleration waveform at the contact edges is calculated and the calculated value is used as the index $V_{tj}$ (j=f, k) of deformation speed of the tread 3.

Also, in this embodiment, the degree M of tire wear is estimated using the V(M)-L map 38M showing a predetermined relationship between the standardized index $V''_t(M)$ of deformation speed and the index $L_t(M)$ of contact length for different degrees M of tire wear. However, the arrangement may also be such that a correlation equation of the measured index $L_t(M)$ of contact length and the standardized index $V''_t(M)$ of deformation speed is determined and the degree M of tire wear is estimated based on the magnitude of the coefficient of this correlation equation or the amount of change thereof from the start of use. Since the lines for the different degrees M of tire wear shown in FIG. 17 have high linearity, the above-mentioned correlation equation can be set up adequately by linear approximation. For example, a linear approximation may be expressed as $V''_t(M)=a \cdot L_t(M)+b$ where a and b are constants. Then, by pre-fixing the value of a, the degree M of tire wear is estimated by the value of b. It should be appreciated also that, as circumstances require, polynomial approximation, exponential approximation, or the like may be used to set up a correlation equation to achieve higher accuracy of estimation.

Also, in this embodiment, the deformation speed of the tread 3 is standardized using the rotation time $T_r$ of the tire. However, it may be standardized using the rotational speed $W_r$ of the tire. That is, since the index $V_{tj}$ (j=f, k) of deformation speed of the tread 3 is proportional to the cube of the rotational speed $W_r$ of the tire, the index $V_{tj}$ (j=f, k) of deformation speed may be divided by the cube of the rotational speed $W_r$ of the tire. The rotational speed $W_r$ of the tire can be obtained by dividing the coefficient S of rotation length, which is the length of one revolution of the tire in a loaded condition, by the rotation time $T_r$, for instance.

Also, in this embodiment, the contact time ratio obtained by dividing the contact time $T_t$ calculated by the contact time calculating means 35 by the rotation time $T_r$ calculated by the rotation time calculating means 34 is used as the index $L_t$ of contact length. However, the contact time $T_t$ may be used as the index $L_t$ of contact length. Or the circumferential length L of the contact patch may be used as the index $L_t$ of contact length. Note also that the circumferential length (contact length) L of the contact patch can be obtained by multiplying the contact time $T_t$ by the rotational speed $W_r$ of the tire.

INDUSTRIAL APPLICABILITY

As described above, the method for estimating the wear of a tire according to the present invention not only enhances the durability of the sensor and the tire but also assures estimation of the degree of tire wear with excellent constancy and accuracy. Hence, the running safety of a vehicle can be enhanced by providing some alarm means that can warn the driver of the wear of the tires.

The invention claimed is:

1. A method for estimating the wear of a tire, comprising:
   detecting a time-series waveform of radial acceleration of the tire by using an acceleration sensor mounted in a tire inner liner portion of the tire;
   measuring index of a deformation speed in a radial direction at or near a contact edge of a tire tread from the detected time-series waveform of the radial acceleration;
   standardizing the index of the deformation speed on information on a rotation time of the tire or information on the rotational speed of the tire; and
   estimating a degree of tire wear from the magnitude of the standardized index of deformation speed.

2. The method for estimating the wear of a tire according to claim 1, wherein the index of deformation speed is standardized by multiplying the measured index of deformation speed by a cube of the rotation time of the tire.

3. The method for estimating the wear of a tire according to claim 1, wherein the index of deformation speed is standardized by dividing the measured index of deformation speed by a cube of rotational speed of the tire.

4. The method for estimating the wear of a tire according to claim 1, wherein the rotation time or rotational speed of the tire is calculated using the signals outputted from the acceleration sensor.

5. The method for estimating the wear of a tire according to claim 4, wherein the time from the point at which a peak appears in the time-series waveform of acceleration outputted from the acceleration sensor or in the temporally-differentiated waveform or temporally-integrated waveform of the time-series waveform of acceleration to the point at which a peak appears in the same position after one revolution of the tire is measured and the measured time is used as the rotation time of the tire.

6. The method for estimating the wear of a tire according to claim 4, wherein the value of a rotation length coefficient divided by the rotation time is used as the rotational speed of the tire.

7. The method for estimating the wear of a tire according to claim 4, wherein the relationship between the index of deformation speed and the degree of tire wear is determined beforehand and the degree of tire wear is estimated by comparing this predetermined relationship between the index of deformation speed and the degree of tire wear with the calculated index of deformation speed.

8. The method for estimating the wear of a tire according to claim 1, wherein the index of contact length of the tire is measured and the degree of tire wear is estimated based on the measured index of contact length and the standardized index of deformation speed.

9. The method for estimating the wear of a tire according to claim 8, wherein the relationship between the standardized index of deformation speed and the index of contact length, relative to the degree of tire wear, is determined beforehand and the degree of tire wear is estimated by comparing the standardized index of deformation speed and the measured index of contact length with the predetermined relationship between the standardized index of deformation speed and the index of contact length.

10. The method for estimating the wear of a tire according to claim 8, wherein a correlation equation of the measured index of contact length and the standardized index of deformation speed is determined and the degree of tire wear is estimated based on the magnitude of the coefficient of this correlation equation.

11. The method for estimating the wear of a tire according to claim 8, wherein the index of contact length is the contact time, which is an interval of time during which a certain part of the tread is in contact with the road surface.

12. The method for estimating the wear of a tire according to claim 8, wherein the index of contact length is the contact time ratio which is obtained by dividing the contact time, which is an interval of time during which a certain part of the tread is in contact with the road surface, by the rotation time.

13. The method for estimating the wear of a tire according to claim 8, wherein the index of contact length is the circumferential length of the contact patch of the tire.

14. The method for estimating the wear of a tire according to claim 13, wherein the value obtained by multiplying the contact time, which is an interval of time during which a certain part of the tread is in contact with the road surface, by the rotational speed of the tire is a circumferential length of the contact patch.

15. The method for estimating the wear of a tire according to claim 8, wherein the index of contact length is calculated using the signals outputted from the acceleration sensor.

16. The method for estimating the wear of a tire according to claim 15, wherein the radial acceleration of the tire is detected by the acceleration sensor, at the same time the time between the two peaks of the temporally-differentiated waveform obtained by temporally differentiating the time-series waveform of the detected radial acceleration of the tire is measured as a contact time, and the index of contact length is calculated using the measured contact time.

17. The method for estimating the wear of a tire according to claim 16, wherein the upper limit of tire speed in estimating the degree of tire wear is 100 km/h.

18. The method for estimating the wear of a tire according to claim 1, wherein the upper limit of tire speed in estimating the degree of tire wear is 100 km/h.

19. The method for estimating the wear of a tire according to claim 1, wherein the differential peak value, which is the magnitude of the peak of a temporally-differentiated waveform obtained by temporally differentiating the time-series waveform of radial acceleration of the tire, the average value of the differential values around the peak, or the slope at or near the contact edge of the time-series waveform of radial acceleration when the peak position is assumed to be at the contact edge of the tire tread is calculated, and one of these values is used as the index of deformation speed.

20. The method for estimating the wear of a tire according to claim 1, wherein the index of deformation speed by which to estimate the degree of tire wear is an average value of the index of deformation speed at or near the leading edge of the contact patch and the index of deformation speed at or near the trailing edge thereof.

* * * * *